United States Patent
Sisodia et al.

(10) Patent No.: US 12,242,317 B2
(45) Date of Patent: Mar. 4, 2025

(54) ELECTRONIC DEVICES WITH MULTIPLE ENERGY STORAGE DEVICES, THERMAL MITIGATION CIRCUITS, AND CORRESPONDING METHODS

(71) Applicant: Motorola Mobility LLC, Chicago, IL (US)

(72) Inventors: Rohit Sisodia, Naperville, IL (US); Xiaofeng Zhu, Nanjing (CN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 81 days.

(21) Appl. No.: 18/132,207

(22) Filed: Apr. 7, 2023

(65) Prior Publication Data

US 2024/0310885 A1    Sep. 19, 2024

Related U.S. Application Data

(63) Continuation of application No. PCT/CN2023/081636, filed on Mar. 15, 2023.

(51) Int. Cl.
| | |
|---|---|
| *G06F 1/20* | (2006.01) |
| *G06F 1/16* | (2006.01) |
| *G06F 1/26* | (2006.01) |
| *G06F 1/3231* | (2019.01) |

(52) U.S. Cl.
CPC ............ *G06F 1/206* (2013.01); *G06F 1/1677* (2013.01); *G06F 1/1683* (2013.01); *G06F 1/263* (2013.01); *G06F 1/3231* (2013.01); *G06F 2200/1637* (2013.01)

(58) Field of Classification Search
CPC ...... G06F 1/206; G06F 1/1677; G06F 1/1683; G06F 1/263; G06F 1/3231; G06F 2200/1637
See application file for complete search history.

(56) References Cited

U.S. PATENT DOCUMENTS

| | | |
|---|---|---|
| 5,340,072 A | 8/1994 | Halbert |
| 5,744,937 A | 4/1998 | Cheon |
| 9,663,297 B1 | 5/2017 | Steinhoff et al. |
| 10,063,677 B2 | 8/2018 | Cavallaro et al. |
| 11,522,985 B1 | 12/2022 | Lim et al. |

(Continued)

OTHER PUBLICATIONS

Meira, Alexandre , "PCT Search Report", PCT/CN/2023/081636; Mailed Sep. 20, 2023.

(Continued)

*Primary Examiner* — Glenn A. Auve
(74) *Attorney, Agent, or Firm* — Philip H. Burrus, IV

(57) ABSTRACT

An electronic device included a first energy storage device coupled to a second energy storage device by a conductor. A thermal mitigation circuit, or alternatively, one or more processors, determine whether to draw more current from the first energy storage device or the second energy storage device as a function of a geometric configuration of the electronic device and a support condition of the electronic device. Current can be drawn from the second energy storage device situated in the second device housing, for example, when the electronic device is hand supported by the first device housing unless secondary factors exist.

23 Claims, 13 Drawing Sheets

(56) References Cited

U.S. PATENT DOCUMENTS

| | | | |
|---|---|---|---|
| 11,747,874 B2* | 9/2023 | Choi | G06F 11/3024 |
| | | | 700/300 |
| 2004/0155503 A1 | 8/2004 | Stumpf et al. | |
| 2012/0274613 A1* | 11/2012 | Ishizuka | G06F 3/0416 |
| | | | 345/204 |
| 2014/0370345 A1 | 12/2014 | Maleki et al. | |
| 2018/0039310 A1* | 2/2018 | Oga | G06F 1/1616 |
| 2018/0224871 A1 | 8/2018 | Sahu | |
| 2019/0272020 A1* | 9/2019 | Woo | G06F 1/1677 |
| 2019/0305563 A1* | 10/2019 | Koki | G06F 1/266 |
| 2020/0036198 A1 | 1/2020 | Kim | |
| 2021/0004065 A1* | 1/2021 | Chandra | G06F 1/1616 |
| 2021/0320504 A1* | 10/2021 | Choi | H02J 7/0047 |
| 2021/0341981 A1* | 11/2021 | Files | H02M 3/07 |
| 2022/0060032 A1* | 2/2022 | Jeong | H02J 7/0025 |
| 2022/0255326 A1* | 8/2022 | Carlson | H02J 7/0045 |
| 2023/0132431 A1* | 5/2023 | Kwak | H02J 7/00 |
| | | | 320/109 |
| 2023/0269313 A1* | 8/2023 | Chang | G06F 1/1683 |
| | | | 455/572 |
| 2024/0103592 A1* | 3/2024 | Lee | H04W 52/18 |

OTHER PUBLICATIONS

Vieira, Alexandre, "PCT Search Report", PCT/CN2023/081728; Mailed Sep. 22, 2023.

* cited by examiner

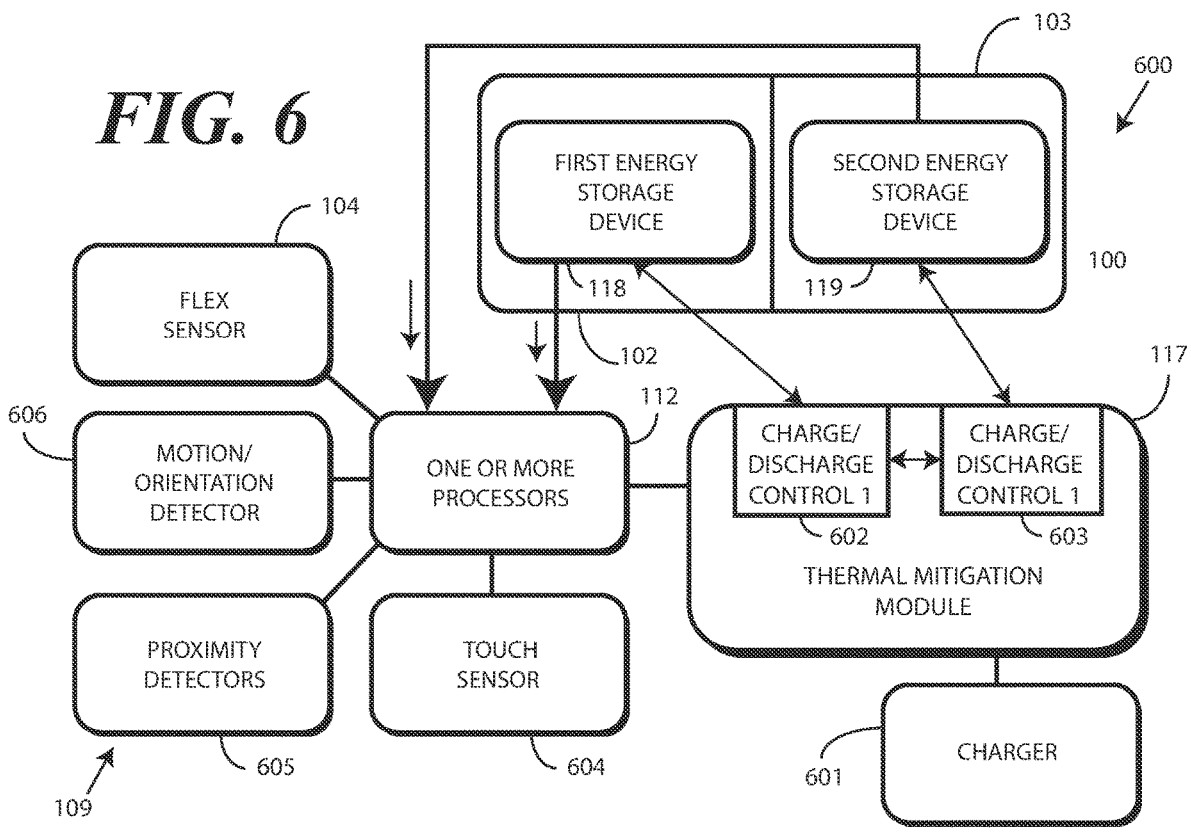

FIG. 6

| DEVICE 701 | CHARGER 702 | MOTION 703 | TOUCH/PROX 704 | STATE 705 |
|---|---|---|---|---|
| AXIALLY DISPLACED OPEN POSITION | NOT CONNECTED | DON'T CARE | FIRST DEVICE HOUSING BEING HELD, BUT NOT BY EAR | DRAIN MORE CURRENT FROM SECOND ENERGY STORAGE DEVICE |
| CLOSED POSITION | NOT CONNECTED | DON'T CARE | DEVICE BEING HELD PREDOM. BY FIRST DEVICE HOUSING | REDUCE CURENT DRAIN FROM BOTH ENERGY STORAGE DEVICES |
| AXIALLY DISPLACED OPEN POSITION | CONNECTED | STATIONARY | NO TOUCH | FAST CHARGE BOTH ENERGY STORAGE DEVICES |

FIG. 7

ELECTRONIC DEVICES WITH MULTIPLE ENERGY STORAGE DEVICES, THERMAL MITIGATION CIRCUITS, AND CORRESPONDING METHODS

CROSS REFERENCE TO PRIOR APPLICATIONS

This application is a continuation claiming priority and benefit under 35 U.S.C. § 120, pursuant to 35 U.S.C. § 365(a), to PCT Application Ser. No. PCT/CN2023/081636, filed Mar. 15, 2023, which is incorporated by reference for all purposes. See MPEP § 1895.

BACKGROUND

Technical Field

This disclosure relates generally to electronic devices, and more particularly to electronic devices having multiple energy storage devices.

Background Art

Portable electronic devices such as smartphones, laptop computers, tablet computers, and two-way radios derive their portability from energy storage devices, one example of which is a rechargeable electrochemical cell. In some situations, an electronic device will include two or more rechargeable cells that are coupled together in serial or in parallel. When the energy stored within the rechargeable cells becomes depleted, it is necessary to attach a power supply to the electronic device to recharge the cells.

Electronic devices using such rechargeable cells come in different mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. Clamshell devices generally have inferior thermal dissipation performance compared to candy bar devices due to their unique design resulting in reduced thermal dissipation surface area. It would be advantageous to have an improved foldable design that mitigates such issues.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 6 illustrates one explanatory circuit in accordance with one or more embodiments of the disclosure.

FIG. 7 illustrates situations and corresponding thermal mitigation solutions for an explanatory electronic device configured in accordance with embodiments of the disclosure.

Figure 1:
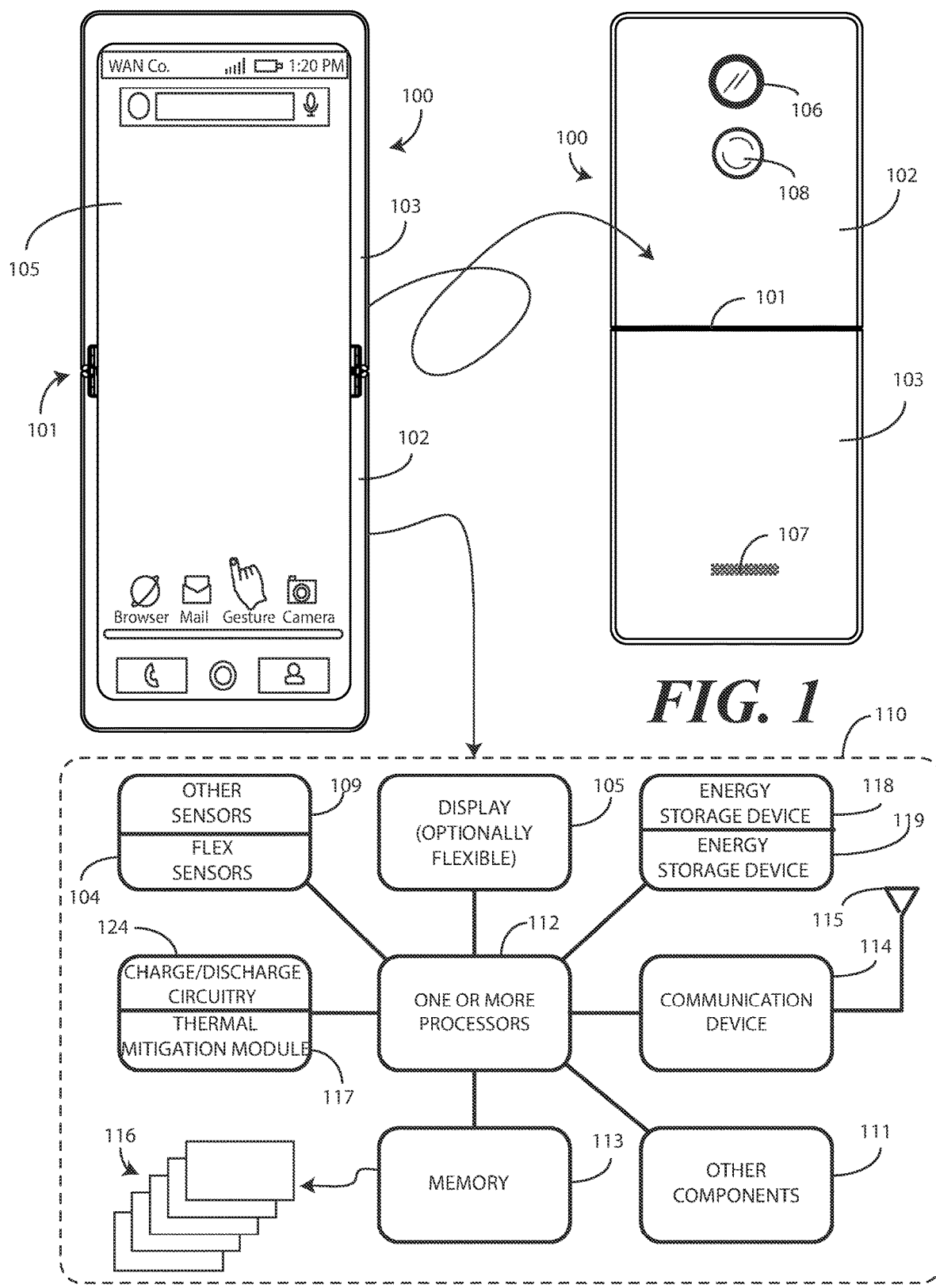
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in an electronic device that includes a first energy storage device situated in a first device housing and a second energy storage device situated in a second device housing, powering one or more processors of the electronic device with more current from the first energy storage device than the second energy storage device when one or more sensors of the electronic device detect a first operating condition of the electronic device, and powering the one or more processors with more current from the second energy storage device than the first energy storage device when the one or more sensors detect a second operating condition of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or charging technology, improve the functioning of the electronic device itself by and improving the performance that can be achieved from a multiple energy storage device system in which non-zero impedances occur in circuit components coupling one energy storage device to another.

It will be appreciated that embodiments of the disclosure described herein may be comprised of one or more conventional processors and unique stored program instructions that control the one or more processors to implement, in conjunction with certain non-processor circuits, some, most, or all of the functions of determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device. The non-processor circuits may include, but are not limited to, a control circuit, switches, overprotection circuits, fuel gauging circuits, diodes, signal drivers, clock circuits, power source circuits, and user input devices.

As such, these functions may be interpreted as steps of a method to perform selecting a first energy storage device to power the electronic device when the one or more sensors determine the electronic device is being supported by a surface or held by the second device housing, or selecting the second energy storage device to power the electronic device when the electronic device is being held by the first device housing. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide circuits and methods for determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device. In one or more embodiments, and electronic device comprises a first energy storage device situated in a first device housing while a second energy storage device is situated in a second device housing. In one or more embodiments, the first device housing is pivotable about a hinge relative to the second device housing between an axially displaced open position and a closed position.

In one or more embodiments, a thermal mitigation circuit is operable with the first energy storage device and the second energy storage device. In one or more embodiments, the thermal mitigation circuit powers the one or more processors of the electronic device with more current from the first energy storage device than the second energy storage device when one or more sensors of the electronic device detect a first operating condition of the electronic device. Alternatively, the thermal mitigation circuit powers the one or more processors with more current from the second energy storage device than the first energy storage device when the one or more sensors detect a second operating condition of the electronic device.

In one or more embodiments, one or both of the first operating condition or the second operating condition comprises a mechanical support condition of the electronic device. The first operating condition and/or second operating condition can also comprise a mechanical configuration of the electronic device, e.g., whether the electronic device is in the axially displaced open position, the closed position, or in a position therebetween.

Illustrating by example, the first operating condition can comprise the electronic device being held by, or held predominantly by, the second device housing when the electronic device is in the axially displaced open position. Similarly, the second operating condition can comprise the electronic device being held by, or predominantly held by, the first device housing when the electronic device is in the axially displaced open position.

As used herein, "predominantly" takes the plain, ordinary, English definition of "mainly, for the most part." Thus, if a person is holding the electronic device with a single hand where seventy percent, seventy-five percent, eighty percent, eighty-five percent, ninety percent, or ninety-five percent of the single hand contacts the first device housing, the person would be "predominantly" holding the electronic device by the first device housing.

To illustrate with another example, in one or more embodiments the first operating condition may comprise the electronic device being held by, or held predominantly by, the second device housing when the electronic device is in the axially displaced open position. The second operating condition may then comprise the electronic device being supported by a surface, regardless of whether the electronic device is in the axially displaced open position or the closed position.

By selecting from which energy storage device to draw current, the thermal mitigation circuit can affect the overall temperature of the electronic device. For instance, when the thermal mitigation circuit draws more current from the first energy storage device situated in the first device housing than the second energy storage device situated in the second device housing, this generally will cause the first device housing to be hotter than the second energy storage device. By making this choice when the electronic device is held by, or held predominantly by, the second device housing, this allows the second device housing to stay cooler than the first device housing, thereby keeping the device housing being held by the user at a lower temperature for more comfort.

Some use cases help to illustrate this advantage. In one or more embodiments, when the electronic device is being held in a portrait orientation, one or more sensors of the electronic device can determine if the electronic device is being held by the bottom device housing. When this occurs, the thermal mitigation circuit can cause more current to be drawn from the energy storage device situated in the upper device housing. By contrast, if the electronic device is being held by the upper device housing, the thermal mitigation circuit can cause more current to be drawn from the energy storage device situated in the lower device housing. When the electronic device is in a landscape orientation or is not being held by a hand, the thermal mitigation circuit may cause an equal amount of current to be drawn from the first energy storage device and second energy storage device to power the one or more processors. In another use case, when the electronic device is not connected to a charger and is being supported by a surface, the thermal mitigation circuit may cause an equal amount of current to be drawn from the first energy storage device and second energy storage device to power the one or more processors.

When the electronic device is connected to a charger, the thermal mitigation circuit may work in reverse, causing more charging current to be delivered to the energy storage device situated in the device housing that is not being held. This works equally well because an energy storage device heats both when it is delivering a load current and when it is receiving a charging current. Accordingly, in another use case when the electronic device is connected to a charger and is being by supported by a surface, the thermal mitigation circuit may cause the energy storage device having the lowest state of charge to receive the most charging current first. Once both energy storage devices reach the same state of charge, the thermal mitigation circuit may cause current to be delivered to both the first energy storage device and the second energy storage device equally.

Things can change, however, when the electronic device is being held while connected to a charger. Illustrating by example, in another use case when the electronic device is connected to a charger and is being supported by a hand, the one or more sensors may determine whether the electronic device is being held by, or held predominantly by, the first device housing or the second device housing. The thermal mitigation circuit can then deliver charging current to the energy storage device situated in the device housing that is not being held or held predominantly.

When no charger is connected, the thermal mitigation circuit can also perform balancing operations. Illustrating by example, when the electronic device is not connected to a charger and is not being used, i.e., when the deformable electronic device is idle, the thermal mitigation circuit can charge the energy storage device situated in the top device housing (which is frequently smaller in capacity that the energy storage device situated in the base) by delivering current from the energy storage device situated in the base to the energy storage device situated in the "flip," which is how many refer to the upper device housing. In so doing, the thermal mitigation circuit prepares the battery in the flip for situations in which the electronic device is being held by the base, which is frequently the most natural way to hold the electronic device.

In effect, embodiments of the disclosure optimize the current drawn from each of the energy storage devices in a multi-energy storage device/multi-device housing electronic device as a function of device position (surface supported or hand supported), device orientation (landscape or portrait), device foldable state (flip open or close), and hand support detection on specific device housing (hand support on flip housing or base housing). For instance, embodiments of the disclosure determine whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device. This allows the device housing not being held by the user to get hotter, while the device housing being held by the user stays cooler.

In one or more embodiments, an electronic device comprises a first device housing coupled to a second device housing by a hinge. In one or more embodiments, the first device housing is pivotable about the hinge relative to the second device housing between an axially displaced open position and a closed position.

In one or more embodiments, the electronic device comprises a first energy storage device situated in the first device housing and a second energy storage device situated in the second device housing. One or more processors operable to perform functions of the electronic device and one or more sensors operable with the one or more processors are powered by the first energy storage device and/or second energy storage device.

In one or more embodiments, the one or more processors select the first energy storage device to power the electronic device when the one or more sensors determine the electronic device is being supported by a surface or held by the second device housing. Alternatively, the one or more processors select the second energy storage device to power the electronic device when the electronic device is being held by the first device housing. This helps to keep the portion of the electronic device being held by a user nice and cool. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 could take any of a variety of shapes. For explanatory purposes, the electronic device 100 is illustrated as a deformable electronic device having a first device housing 102 and a second device housing 103 coupled together by a hinge 101. This construct is used for explanatory purposes herein because it provides an illustration of how multiple energy storage devices can be arranged in the electronic device. In one or more embodiments, an electrical conductor spans the hinge to couple circuit components together.

For instance, when a first energy storage device 118 is situated within the first device housing 102, with a second energy storage device 119 situated in the second device housing 103, an electrical conductor can span the hinge 101 to couple these energy storage devices together. While a deformable device is one explanatory situation in which multiple energy storage devices situated in substantially different locations of an electronic device, others will be obvious to those of ordinary skill in the art having the benefit of this disclosure. Accordingly, the electronic device 100 of FIG. 1 is illustrative only.

In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown in FIG. 1 and described below with reference to FIG. 4.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure.

In the illustrative embodiment of FIG. 1, the electronic device 100 includes a single hinge 101. However, in other embodiments two or more hinges can be incorporated into the electronic device 100 to allow it to be folded in multiple locations. Similarly, while two energy storage devices are shown in the electronic device 100 of FIG. 1, the electronic device 100 could include three or more energy storage devices as well.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 105. This allows the display 105 to be flexible so as to deform when the first device housing 102 pivots about the hinge 101 relative to the second device housing 103. However, it should be noted that other types of displays suitable for use with the electronic device 100 will be obvious to those of ordinary skill in the art having the benefit of this disclosure. Illustrating by example, in other embodiments multiple displays can be used. For instance, a first rigid display can be coupled to the first device housing 102, while a second, separate rigid display can be coupled to the second device housing 103, with the hinge 101 separating the two displays.

Features can be incorporated into the first device housing 102 and/or the second device housing 103. Examples of such features include a image capture device 106 or an optional speaker port 107, which are shown disposed on the rear side of the electronic device 100 in this embodiment but could be placed on the front side as well. In this illustrative embodiment, a user interface component 108, which may be a button or touch sensitive surface, can also be disposed along the rear side of the second device housing 103. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards. For example, some components of the block diagram schematic 110 can be configured as a first electronic circuit fixedly situated within the first device housing 102, while other components of the block diagram schematic 110 can be configured as a second electronic circuit fixedly situated within the second device housing 103. A flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
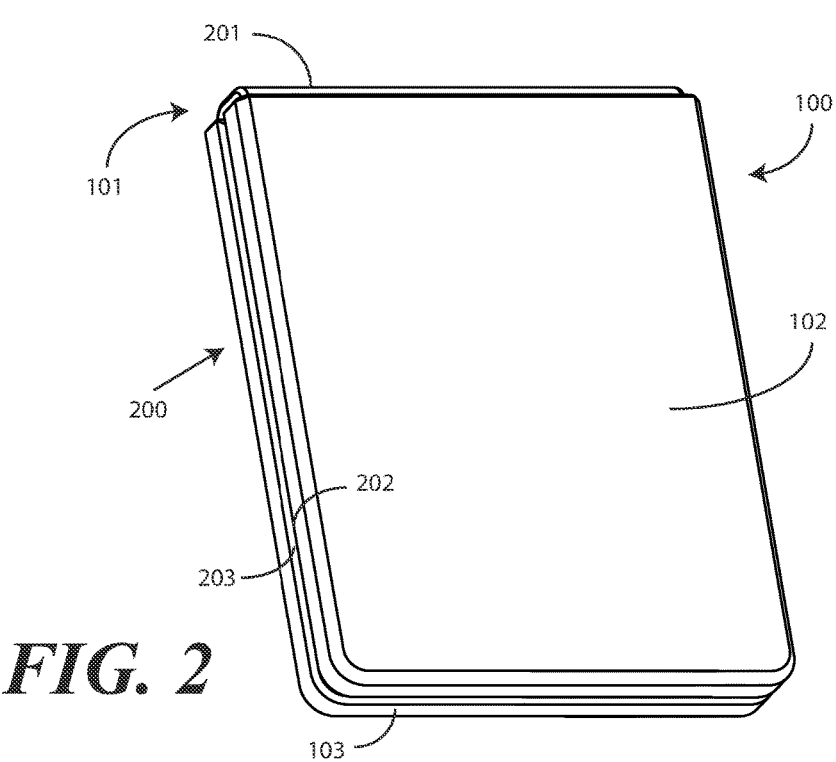
FIG. 2 illustrates a perspective view of one explanatory electronic device in accordance with one or more embodiments of the disclosure in a closed position.
Figure 3:
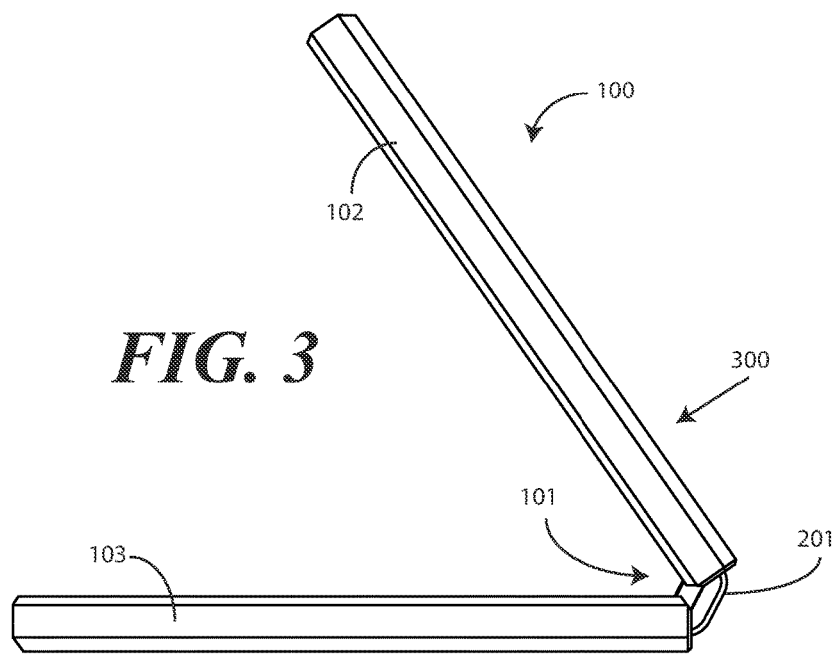
FIG. 3 illustrates a side elevation view of one explanatory electronic device in accordance with one or more embodiments of the disclosure in a partially open position.

In one embodiment, the electronic device 100 optionally includes one or more flex sensors 104, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 104 is optional, and in some embodiment flex sensors 104 will not be included.

In one embodiment, the one or more processors 112 may generate commands or execute control operations based on information received from the various sensors, including the one or more flex sensors 104, the user interface, or the other sensors 109. The one or more processors 112 may also generate commands or execute control operations based upon information received from a combination of the one or more flex sensors 104, the user interface, or the other sensors 109. Alternatively, the one or more processors 112 can generate commands or execute control operations based upon information received from the one or more flex sensors 104 or the user interface alone. Moreover, the one or more processors 112 may process the received information alone or in combination with other data, such as the information stored in the memory 113.

The one or more other sensors 109 may include a microphone, an earpiece speaker, a second loudspeaker (disposed beneath speaker port 107), and a user interface component such as a button or touch-sensitive surface. The one or more other sensors 109 may include one or more of an accelerometer, gyroscope, image capture device, and/or display touch sensors to determine whether the electronic device 100 is being held on the base side or flip side in a portrait mode.

The one or more other sensors 109 may also include key selection sensors, proximity sensors, a touch pad sensor, a touch screen sensor, a capacitive touch sensor, and one or more switches. Touch sensors may be used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 109 can also include audio sensors and video sensors (such as a camera).

The other sensors 109 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 111 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the electronic device 100 comprises a first energy storage device 118 and a second energy storage device 119. The first energy storage device 118 and the second energy storage device 119 can take a variety of forms.

In an illustrative embodiment shown below in FIG. 6, the first energy storage device 118 and the second energy storage device 119 each comprise electrochemical cells. For instance, the first energy storage device 118 and the second energy storage device 119 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the first energy storage device 118 and the second energy storage device 119 may be a supercapacitor, and so forth.

In one or more embodiments, the first energy storage device 118 is situated within the first device housing 102, while the second energy storage device 119 is situated within the second device housing 103. In one or more embodiments, an electrical conductor couples the first energy storage device 118 to the second energy storage device 119 and/or the first energy storage device 118 and second energy storage device 119 to the one or more processors 112.

Charging circuitry 124 can be included to selectively charge the first energy storage device 118 and the second energy storage device 119 when depleted. In one or more embodiments, the charging circuitry 124 comprises a charging node that is coupled to the first energy storage device 118. In one or more embodiments, the charging circuitry also includes another conductor coupling the charging node to the second energy storage device 119.

In one or more embodiments, the charging circuitry 124 includes a switch that is electrically coupled between the conductor coupling the first energy storage device 118 to the second energy storage device 119 and the second energy storage device 119. Opening the switch disconnects the conductor from the second energy storage device 119, while closing the switch couples, in one or more embodiments, the cathode of the first energy storage device 118 to the cathode of the second energy storage device 119.

In one or more embodiments, a thermal mitigation circuit 117 is operable to power the one or more processors 112 and other components of the block diagram schematic 110 from one or both if the first energy storage device 118 and/or the second energy storage device 119. Illustrating by example, in one or more embodiments the thermal mitigation circuit 117 powers the one or more processors 112 with more current from the first energy storage device 118 than the second energy storage device 119 when the one or more sensors 109 detect a first operating condition of the electronic device 100. By contrast, the thermal mitigation circuit 117 can power the one or more processors 112 with more current form the second energy storage device 119 than the first energy storage device when the one or more sensors 109 detect a second operating condition of the electronic device 100.

Examples of the first operating condition and second operating condition that cause this section of which energy storage device to power the one or more processors 112 can vary. Illustrating by example, in one or more embodiments the first operating condition comprises the electronic device 100 being held by, or held predominantly by, the second device housing 103 when the electronic device 100 is in the axially displaced open position, while the second operating condition comprises the electronic device 100 being held by, or held predominantly by, the first device housing 102 when the electronic device 100 is in the axially displaced open position.

In effect, the one or more processors 112 are powered from current from an energy storage device situated in the device housing other than the one being held. Thus, if a user is holding the first device housing 102 and the second energy storage device 119 situated in the second device housing 103 is sufficiently charged, it can power the one or more processors 112. Likewise, if a user is holding the second device housing 103 and the first energy storage device 118 is sufficiently charged, the one or more processors 112 can be powered by the first energy storage device 118. This works to keep the device housing the user is holding cool since the other device housing the energy storage device powering the one or more processors 112 will warm due to the discharge of current.

In other embodiments, the first operating condition comprises the electronic device 100 being held by, or held predominantly by, the second device housing 103 while the electronic device is in the axially displaced open position, while the second operating condition comprises the electronic device 100 being supported by a surface. Embodiments of the disclosure contemplate that in electronic devices such as that shown in FIG. 1, it will frequently be the case that the energy storage device 118 situated in the first device housing 102 is larger than the energy storage device 119 situated in the second device housing 103 due to the fact that the second device housing 103 may have features such as the image capture device 106 or user interface component 108, or alternatively even an externally facing second display situated therein. This restricts the size of the energy storage device 119 that can situate within the second device housing 103. Thus, when heating is not at issue, such as when the electronic device 100 is supported by the surface, in one or more embodiments the thermal mitigation circuit 117 draws current from the larger energy storage device 118 situated in the first device housing 102 to reserve energy in the second energy storage device 119 for the frequently occurring situation when a person is holding the first device housing 102.

In still another embodiment, the first operating condition comprises the electronic device 100 being supported by a surface. The second operating condition then comprises the electronic device 100 being held while in the closed position.

In one or more embodiments, the first operating condition comprises the electronic device 100 being held by, or held predominantly by, the first device housing 102 while the electronic device 100 is in the axially displaced open position and a performance application is operating on the one or more processors 112. (As used herein, a "performance application" is an application requiring a majority of the computing resources offered by the one or more processors 112. Examples of performance applications include gaming applications, cryptocurrency mining applications, and high-resolution video processing applications.) Embodiments of the disclosure contemplate that when such a performance application is operating on the one or more processors, it will be desirable to draw current from the first device housing 102 even when the user is holding the first device housing 102 because the first energy storage device 118 is generally larger than the second energy storage device 119 carried by the second device housing 103, as noted above. Accordingly, in one or more embodiments the first operating condition comprises the electronic device 100 being held by, or held predominantly by, the first device housing 102 while in an axially displaced open position with a performance application operating on the one or more processors 112.

In one or more embodiments, the second condition then comprises the electronic device 100 being held by, or held predominantly by, the second device housing 103 when a difference between a first energy storage device energy storage level and a second energy storage device energy storage level exceeds a predefined threshold. Illustrating by example, when the user is holding the second device housing 103 and the energy storage level of the first energy storage device 118 carried by the first device housing 102 is too low to power the one or more processors, the thermal mitigation circuit 117 may cause current from the second energy storage device 119 carried by the second device housing 103 despite the fact that the user is holding the second device housing 103. Despite this not being preferred, it allows the electronic device 100 to continue operation when the first energy storage device 118 is insufficiently charged to continue operations.

In still other embodiments, the first operating condition comprises the electronic device 100 being held by, or held predominantly by, the first device housing 102 while the second device housing 103 is adjacent to an ear. For example, when the electronic device 100 is configured as a smartphone as is the case in FIG. 1, embodiments of the disclosure contemplate that the ear may actually be more sensitive to heat than is the hand. Accordingly, when the second device housing 103 is adjacent to an ear, as determined by the one or more sensors 109, in one or more embodiments the thermal mitigation circuit 117 causes current from the first energy storage device 118 carried by the first device housing 102 to power the one or more processors 112 and other circuitry despite the user holding the first device housing 102. Despite this not being preferred, it allows the heat to be absorbed by the hand rather than the ear, thereby increasing the comfort experienced by the user over electronic devices that warm the second device housing 103 by drawing current from an energy storage device situated there as well.

However, when the electronic device 100 is removed from the ear, a second operating condition occurs. In one or more embodiments, the second operating condition comprises the electronic device being held by, or held predominantly by, the first device housing 102 while the second device housing 103. Thus, when the user places the second device housing 103 of the electronic device against the ear, current is drawn from the first energy storage device 118 in the first device housing 102 despite the user holding the first device housing 102. However, when removed from the ear, the preferred mode of operation can return where current is drawn from the second energy storage device 119 carried by the second device housing 103 when the electronic device 100 is being held by the first device housing 102. These operating contexts are illustrative only. Others will be described below. Still others will be obvious to those of ordinary skill in the art having the benefit of this disclosure.

In some embodiments, all current powering the one or more processors 112 and other circuit components of the block diagram schematic 110 can be drawn from a single energy storage device. Illustrating by example, in one or more embodiments the thermal mitigation circuit 117 powers the one or more processors 112 with current only from the first energy storage device 118 when the one or more sensors 109 detect the first operating condition of the electronic device. Similarly, the thermal mitigation circuit 117 can power the one or more processors 112 with current only from the second energy storage device 119 when the one or more sensors 109 detect the second operating condition of the electronic device 100.

Charging operations can work in the same manner. For instance, in one or more embodiments the thermal mitigation circuit 117 charges the first energy storage device 118 with more current than the second energy storage device 119 when the one or more sensors 109 detect a third operating condition of the electronic device 100. However, the thermal mitigation circuit 117 charges the second energy storage device 119 with more current the first energy storage device 118 when the one or more sensors 109 detect a fourth operating condition of the electronic device 100.

Illustrating by example, in one or more embodiments the third operating condition comprises the electronic device 100 being held by, or held predominantly by, the second device housing 103 when the electronic device 100 is in the axially displaced open position and a charger is connected to the electronic device 100. In one or more embodiments, the fourth operating condition comprises the electronic device 100 being held by, or held predominantly by, the first device housing 102 when the electronic device 100 is in the axially displaced open position and connected to the charger. This causes the energy storage device situated in the device housing not being held to charge first, thereby warming the device housing other than the one the user is holding. When that energy storage device is sufficiently charged, the energy storage device situated in the device housing being held can be charged. While this will generate some heat and is not optimal, it does allow each energy storage device to fully charge for maximum electronic device performance.

It should be noted that the thermal mitigation circuit 117 can be a stand-alone, hardware component such as an integrated circuit operable with one or more switches and/or relays to perform the operations described above. The thermal mitigation circuit 117 can be operable with the one or more processors 112. Alternatively, the functions of the thermal mitigation circuit 117 can be performed by the one or more processors 112. The thermal mitigation circuit 117 can be a hardware component of the one or more processors 112, integrated into the one or more processors 112, and so forth.

Thus, as described above, in one or more embodiments the one or more processors 112 can select between the first energy storage device 118 to power the electronic device 100 when the one or more sensors 109 determine the electronic device 100 is being supported by a surface or held by the second device housing 103. Similarly, the one or more processors 112 can select the second energy storage device 119 to power the electronic device 100 when the electronic device 100 is being held by the first device housing 100.

When a charger (illustrated below with reference to FIG. 6) is connected, the one or more processors 112 can select the first energy storage device 118 to be charged by the charger when the one or more sensors 109 determine the electronic device 100 is being supported by the surface or held by the second device housing 103. The one or more processors can select the second energy storage device 119 to be charged by the charger when the electronic device 100 is being held by the first device housing 100. In one or more embodiments, the one or more processors 112 may also select the second energy storage device 119 to power the electronic device 100 when the electronic device 100 is being held while in the closed position.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in a closed position or state. In this state, the first device housing 102 has been pivoted about the hinge 101 toward the second device housing 103 to a closed position 200. When in the closed position 200, a front surface 202 of the first device housing 102 abuts a front surface 203 of the second device housing 103.

In this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the display (105) is revealed.

In some embodiments, features can be included to further retain the electronic device 100 in the closed position 200.

Illustrating by example, in one embodiment a mechanical latch can be included to retain the first device housing 102 and the second device housing 103 in the closed position 200. In other embodiments, magnets can be incorporated into the front surface 202 of the first device housing 102 and the front surface 203 of the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 to perform this function as well. In other embodiments torsion springs used in combination with a cam having mechanical detents and a stator with mechanical protrusions are used to perform this function. Still other mechanical structures and devices suitable for retaining the electronic device 100 in the closed position 200 will be obvious to those of ordinary skill in the art having the benefit of this disclosure.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figure 4:
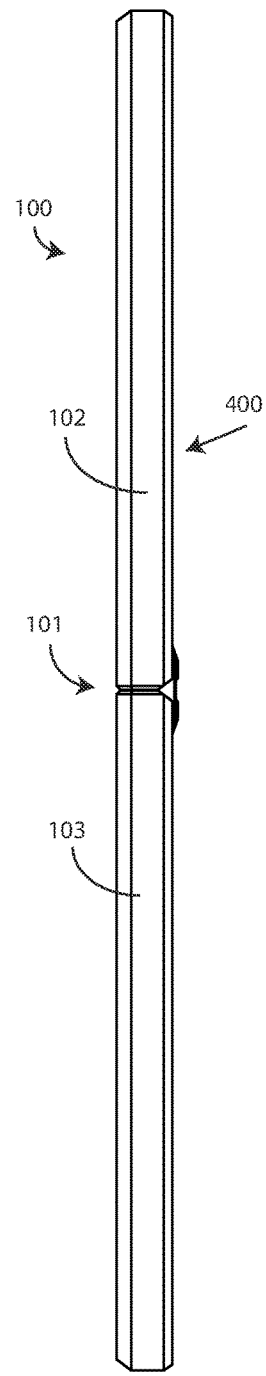
FIG. 4 illustrates a side elevation view of one explanatory electronic device in accordance with one or more embodiments of the disclosure in an axially displaced open position.

Turning now to FIG. 4, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the display (105). In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display, the flexible display has been elongated into a flat position.

Figure 5:
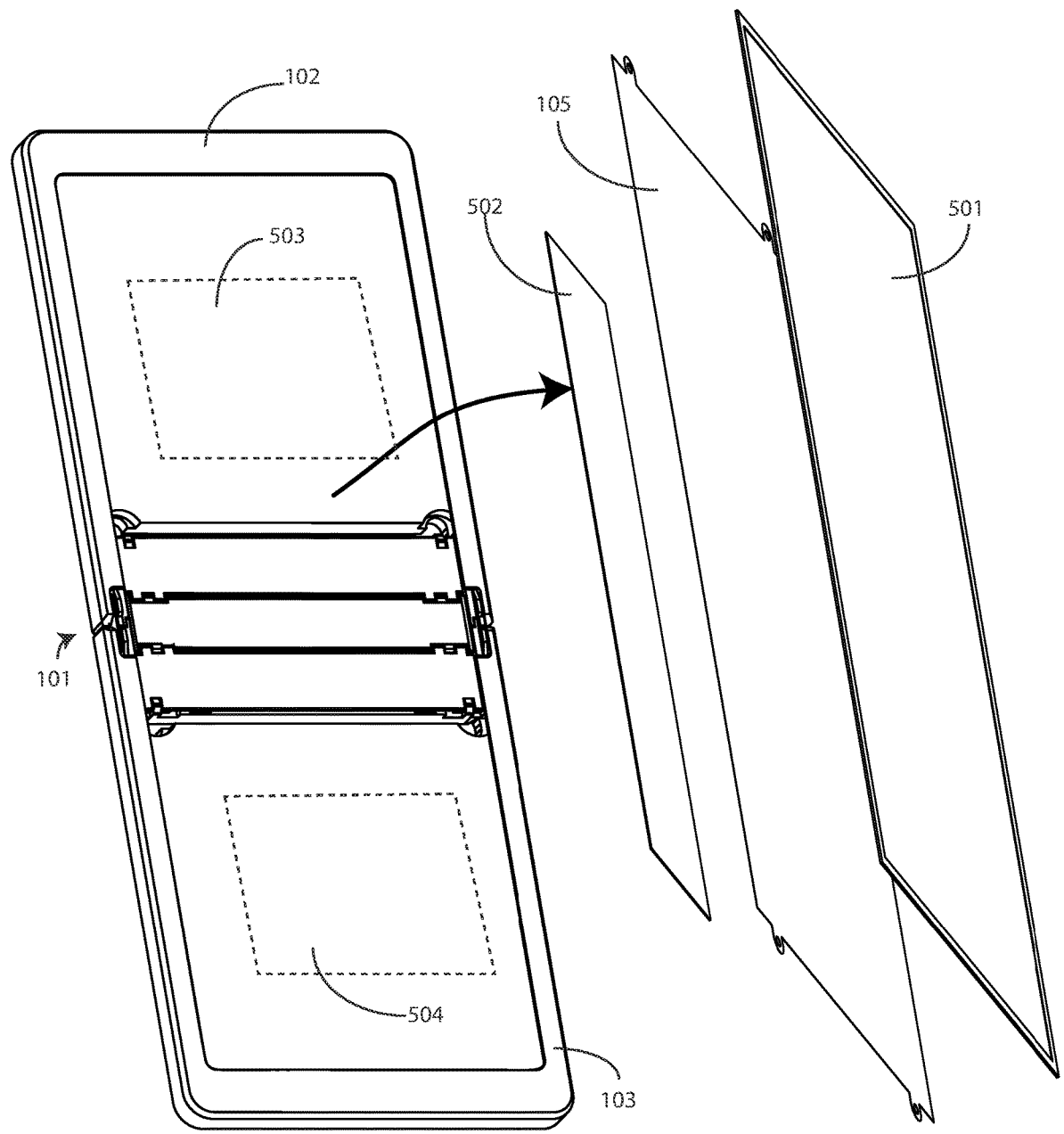
FIG. 5 illustrates an exploded view of one explanatory electronic device in accordance with one or more embodiments of the disclosure in the axially displaced open position.

Turning now to FIG. 5, illustrated therein is an exploded view of the electronic device 100. This view of the electronic device 100 allows various components of the first device housing 102, the second device housing 103, and the hinge 101 to be more clearly seen due to the fact that the display 105 and other components have been detached from the first device housing 102 and the second device housing 103 and shown in an exploded format.

As shown in FIG. 5, the display 105 is situated beneath a flexible fascia 501, which serves as a protective layer for the display 105. The display 105 and the flexible fascia 501 can be coupled to the first device housing 102 and the second device housing 103 so as to span the hinge 101. This allows the display 105 and flexible fascia 501 to deform when the first device housing 102 pivots about the hinge 101 relative to the second device housing 103.

Also shown in FIG. 5 is the flexible substrate 502. In one or more embodiments, the flexible substrate 502 provides a reliable electrical link through the hinge 101 between a first electronic circuit 503 disposed in the first device housing 102 and a second electronic circuit 504 disposed in the second device housing 103. In one or more embodiments, the flexible substrate 502 spans the hinge to couple the first electronic circuit 503 to the second electronic circuit 504.

Turning now to FIG. 6, illustrated therein is a schematic diagram 600 illustrating further details of one example the electronic device 100 of FIG. 1. As shown, the electronic device 100 includes a first device housing 102 and a second device housing 103. A first energy storage device 118 is situated in the first device housing 102, while a second energy storage device 119 is situated in the second device housing 103.

In one or more embodiments, the thermal mitigation circuit 117 is operable with the first energy storage device 118 and the second energy storage device 119. In one or more embodiments, the thermal mitigation circuit 117 comprises charge and discharge control 602 responsible for charging, and discharging, the first energy storage device 118. Similarly, another charge and discharge control 603 is responsible for charging, and discharging, the second energy storage device 119. In one or more embodiments, the charge and discharge control 602 and the other charge and discharge control 603 can communicate with each other to optimize load balancing of the first energy storage device 118 and second energy storage device 119, thermal mitigation in the first device housing 102 and second device housing 103, and other conditions.

When a charger 601 is coupled to the thermal mitigation circuit 117, the charge and discharge control 602 and the other charge and discharge control 603 can charge the first energy storage device 118 and second energy storage device 119, respectively. The charge and discharge control 602 and the other charge and discharge control 603 can also power the one or more processors 112 and other components of the electronic device 100.

One or more sensors 109 of the electronic device 100 are shown in FIG. 6. In this illustration, the one or more sensors 109 comprise a flex sensor 104 configured to determine whether the electronic device 100 is in the axially displaced open position, the closed position, or somewhere in between. The one or more sensors 109 also include a touch sensor 604 to determine whether a user is holding, or predominantly holding, the electronic device 100 by the first device housing 102 or the second device housing 103. The one or more sensors 109 also include a motion/orientation detector 606 to determine whether the electronic device 100 is moving and its geometric orientation in three-dimensional space, such as whether the electronic device 100 is in a portrait orientation or a landscape orientation. The one or more sensors 109 also comprise one or more proximity sensors 605 that can detect objects approaching, or proximately located with, the first device housing 102 and/or the second device housing 103.

It should be noted that the one or more sensors 109 shown in FIG. 6 are not comprehensive, as others will be obvious to those of ordinary skill in the art having the benefit of this disclosure. Additionally, it should be noted that the one or more sensors 109 shown in FIG. 6 could be used alone or in combination. Accordingly, many electronic devices will employ only subsets of the one or more sensors 109 shown in FIG. 6, with the particular subset chosen being defined by device application.

The touch sensor 604 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 112, to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

The motion/orientation detector 606 can include an accelerometer, gyroscopes, or other devices that sense motion or geometric orientation of the electronic device 100 in three-dimensional space. Using an accelerometer as an example, an accelerometer can be included to detect motion of the electronic device. Additionally, the accelerometer can be used to sense some of the gestures of the user, such as one talking with their hands, running, or walking.

The motion/orientation detector 606 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

The proximity sensors 605 fall in to one of two camps: active proximity sensors and "passive" proximity sensors. These are referred to as proximity detector components and proximity sensor components. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components are sometimes referred to as a "passive IR system" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

In one embodiment, the signal receiver of each proximity sensor component can operate at various sensitivity levels so as to cause the at least one proximity sensor component to be operable to receive the infrared emissions from different distances. For example, the one or more processors 112 can cause each proximity sensor component to operate at a first "effective" sensitivity so as to receive infrared emissions from a first distance. Similarly, the one or more processors 112 can cause each proximity sensor component to operate at a second sensitivity, which is less than the first sensitivity, so as to receive infrared emissions from a second distance, which is less than the first distance. The sensitivity change can be made by causing the one or more processors 112 to interpret readings from the proximity sensor component differently.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

While the one or more sensors 109 shown in FIG. 6 work well to determine whether a user is holding the electronic device 100 by the first device housing 102 or the second device housing 103, other devices, one example of which is the image capture device (106) of FIG. 1, can be used as well. The image capture device (106) can be configured to capture an image of an object and determine whether the object matches predetermined criteria. For example, the image capture device (106) can operate as an identification module configured with optical recognition such as include image recognition, character recognition, visual recognition, facial recognition, color recognition, shape recognition and the like. Advantageously, the image capture device (106) can be used as a facial recognition device to determine the identity of one or more persons detected about an electronic device.

For example, in one embodiment when the one or more proximity sensor components detect a person, the image capture device (106) can capture a photograph of that person. The image capture device (106) can then compare the image to a reference file stored in memory (113), to confirm beyond a threshold authenticity probability that the person's face sufficiently matches the reference file. Beneficially, optical recognition allows the one or more processors 112 to execute control operations only when one of the persons detected about the electronic device are sufficiently identified as the owner of the electronic device.

In addition to capturing photographs, the image capture device (106) can function in other ways as well. For example, in some embodiments the image capture device (106) can capture multiple successive pictures to capture more information that can be used to determine when the electronic device 100 is being supported by a surface. Alternatively, the image capture device (106) can capture or video frames, with or without accompanying metadata such as motion vectors.

In one or more embodiments, the thermal mitigation circuit 117 determines whether to draw more current from the first energy storage device 118 situated in the first device housing 102 or the second energy storage device 119 situated in the second device housing 103. In one or more embodiments, the thermal mitigation circuit 117 makes the selection as a function of a support condition of the electronic device 100 and a geometric configuration of the electronic device 100, each detected by the one or more sensors 109 of the electronic device 100.

Illustrating by example, the flex sensor 104 can determine the geometry of the electronic device 100, while the motion/orientation detector 606 determines an orientation of the electronic device 100 in three-dimensional space. Similarly, the proximity sensors 605 and/or touch sensor 604 can determine whether the electronic device 100 is being held by, or held predominantly by, the first device housing 102 or the second device housing 103. Thus, the one or more sensors 109 may determine a support condition that involves the electronic device 100 being held while the geometric configuration comprises the electronic device 100 being in the axially displaced open position.

In one or more embodiments, the support condition comprises the electronic device 100 being held by, or held predominantly by, the first device housing 102. In one or more embodiments, this results in the thermal mitigation circuit 117 drawing more current from the second energy storage device 119. By contrast, when the support condition comprises the electronic device 100 being held by, or held predominantly by, the second device housing 103, the thermal mitigation circuit 117 will draw more current from the first energy storage device 118 as previously described.

Where the support condition comprises the electronic device 100 being held, and the geometric configuration comprises the electronic device 100 being in the closed position, in one or more embodiments the thermal mitigation circuit 117 draws more current from the second energy storage device 119 since it is likely that the first device housing 102 is situated against the hand of the user. By contrast, when the support condition comprises the electronic device 100 being supported by a surface, and the geometric configuration comprises the electronic device 100 being in the axially displaced open position, in one or more embodiments the thermal mitigation circuit 117 draws more current from the first energy storage device 118 because the first energy storage device 118 frequently has a higher energy storage capacity.

When the charger 601 is connected, charging operations can occur in a similar manner. Illustrating by example, in one or more embodiments the thermal mitigation circuit 117, using the charge and discharge control 602 and other charge and discharge control 603, determine whether to charge the first energy storage device 118 situated in the first device housing 102 or the second energy storage device 119 situated in the second device housing 103 as a function of the support condition of the electronic device 100 detected by the one or more sensors 109 and the geometric configuration of the electronic device 100, also detected by the one or more sensors 109. For instance, when the support condition comprises the electronic device 100 being supported by a surface and the geometric configuration comprises the electronic device 100 being in a partially open position similar to that shown above in FIG. 3, the thermal mitigation circuit 117 may draw more current from the first energy storage device 118 due to its larger size, and so forth.

A table of only some of the many potential scenarios is shown in FIG. 7. Turning now to FIG. 7, illustrated therein is a table 700 indicating some possible geometric configurations 701 of an electronic device, a charger connection status 702, a device motion status 703, and a touch status 704 of the electronic device. The determination 705 of whether to draw more current from a first energy storage device situated in a first device housing or a second energy storage device situated in a second device housing is also shown. It should be noted that these three examples are illustrative only to better teach how embodiments of the disclosure operate. Numerous others not shown in the table 700 of FIG. 7 can occur and will be obvious to those of ordinary skill in the art having the benefit of this disclosure.

In one or more embodiments, when the electronic device is in the axially displaced open position and no charger is connected, more current is drawn from the energy storage device situated in the second device housing when the first device housing is being held and the electronic device is not adjacent to an ear. However, when the electronic device is in a closed position and no charger is connected, current is drawn from both the first energy storage device and the second energy storage device when the device is being held by, or held predominantly by, the first device housing.

When a charger is connected, and the electronic device is in the axially displaced open position without being touched, both the first energy storage device and the second energy storage device can be rapidly charged while the device is stationary, as this likely indicates the electronic device is being supported by a surface. When the electronic device is picked up, one of the other techniques described above can be used to charge one of the first energy storage device or the second energy storage device more than another of the first energy storage device or the second energy storage device.

Figure 8:
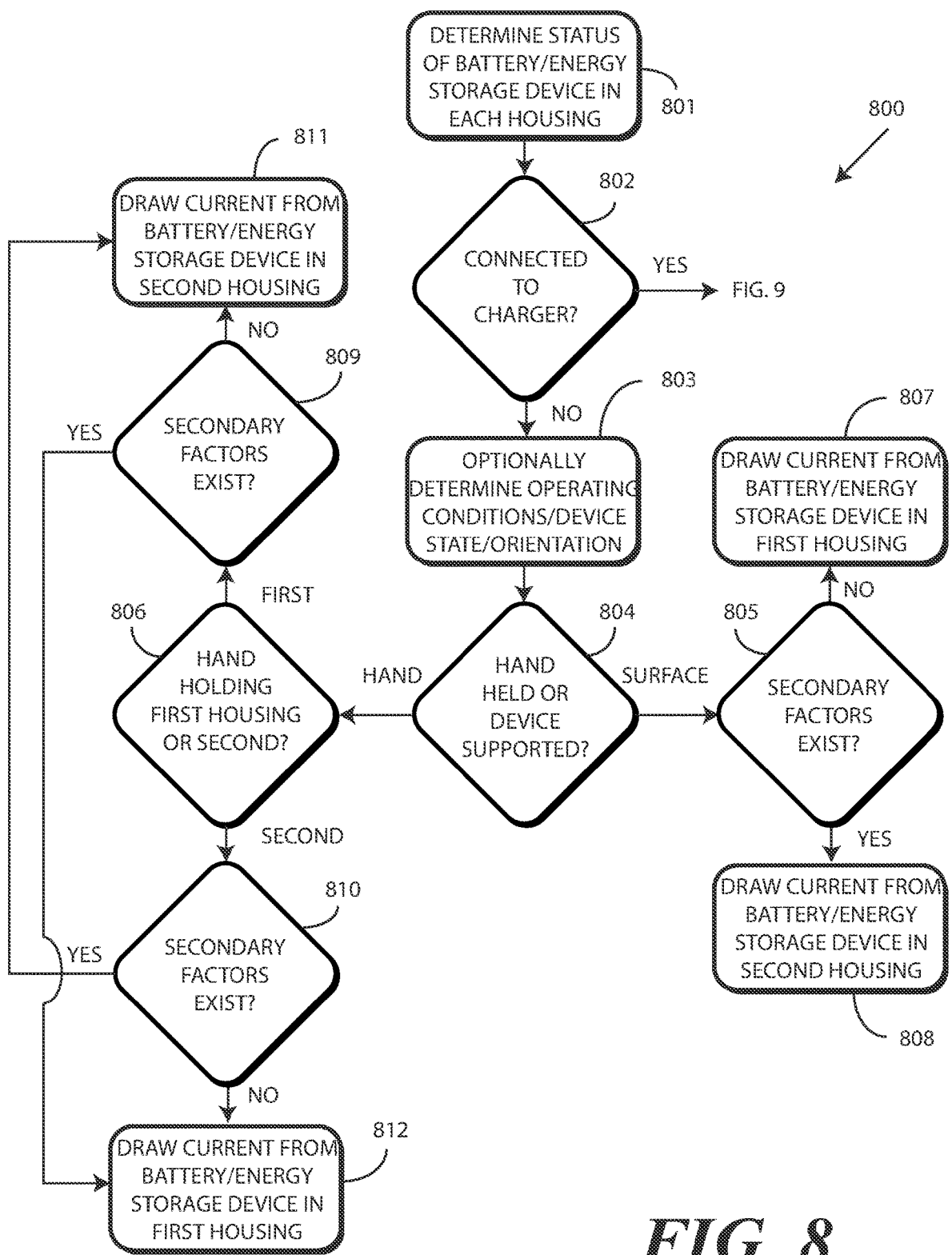
FIG. 8 illustrates one explanatory method in accordance with one or more embodiments of the disclosure.
Figure 9:
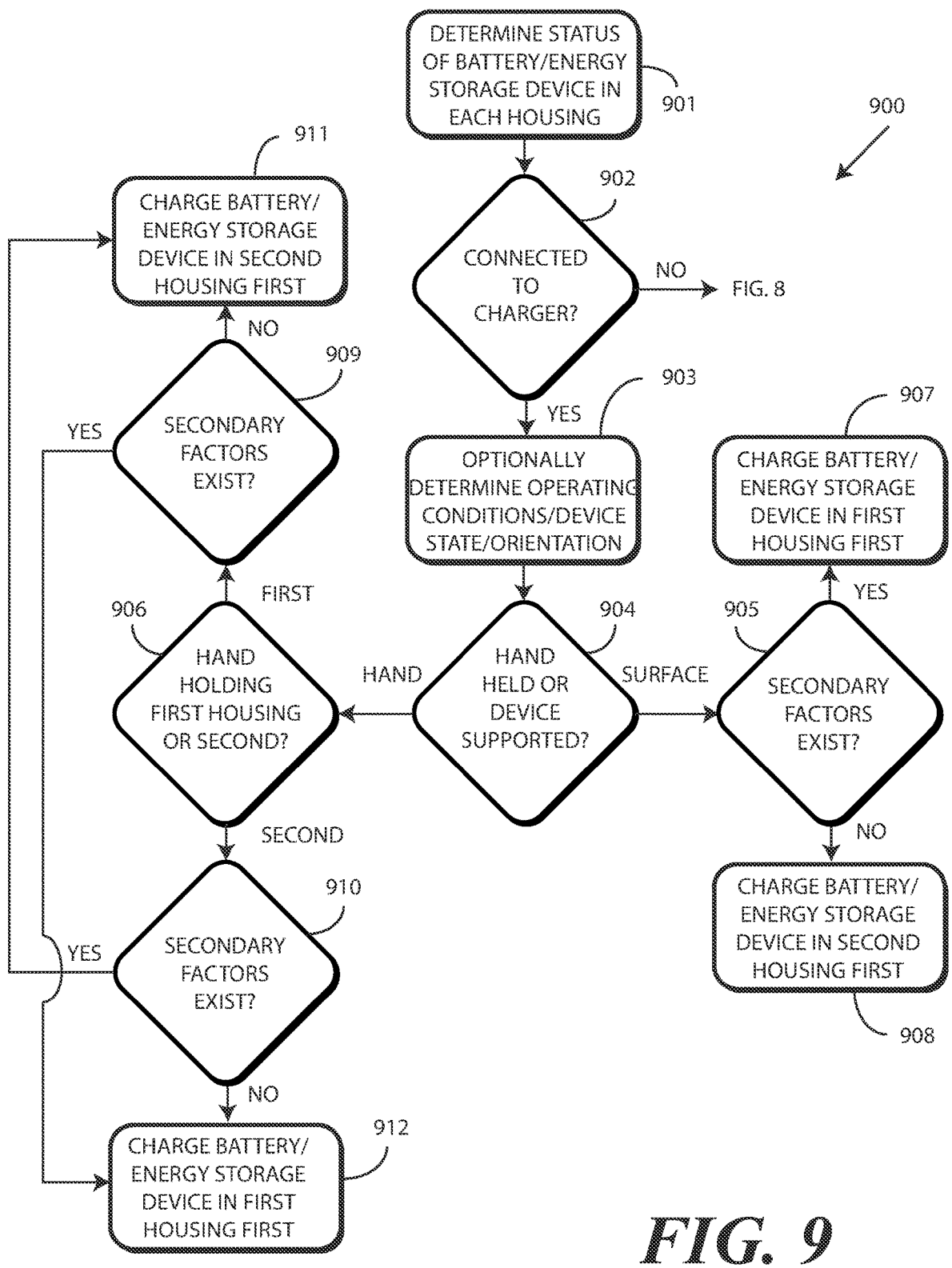
FIG. 9 illustrates another explanatory method in accordance with one or more embodiments of the disclosure.

Turning now to FIGS. 8 and 9, illustrated therein are general methods 800,900 for discharging and charging energy storage devices in an electronic device having multiple energy storage devices in accordance with embodiments of the disclosure, respectively. The method 800 of FIG. 8 is directed to determining from which energy storage device to draw current to power components of an electronic device, while the method 900 of FIG. 9 is directed to determining to which energy storage device to deliver charging current when a charger, such as that shown above with reference to FIG. 6, is connected to the electronic device. In one or more embodiments, the methods 800,900 are directed to electronic devices having a first device housing that is pivotally coupled to a second device housing by a hinge such that the first device housing and second device housing can pivot between an axially displaced open position and a closed position.

Beginning with FIG. 8, at step 801 one or more processors or a thermal mitigation circuit of an electronic device determine the amount of energy stored in the energy storage device situated in the first device housing and the second device housing. If a single energy storage device is situated in the first device housing and another energy storage device is situated in the second device housing, step 801 can comprise determining how much energy is stored in each energy storage device.

Figure 10:
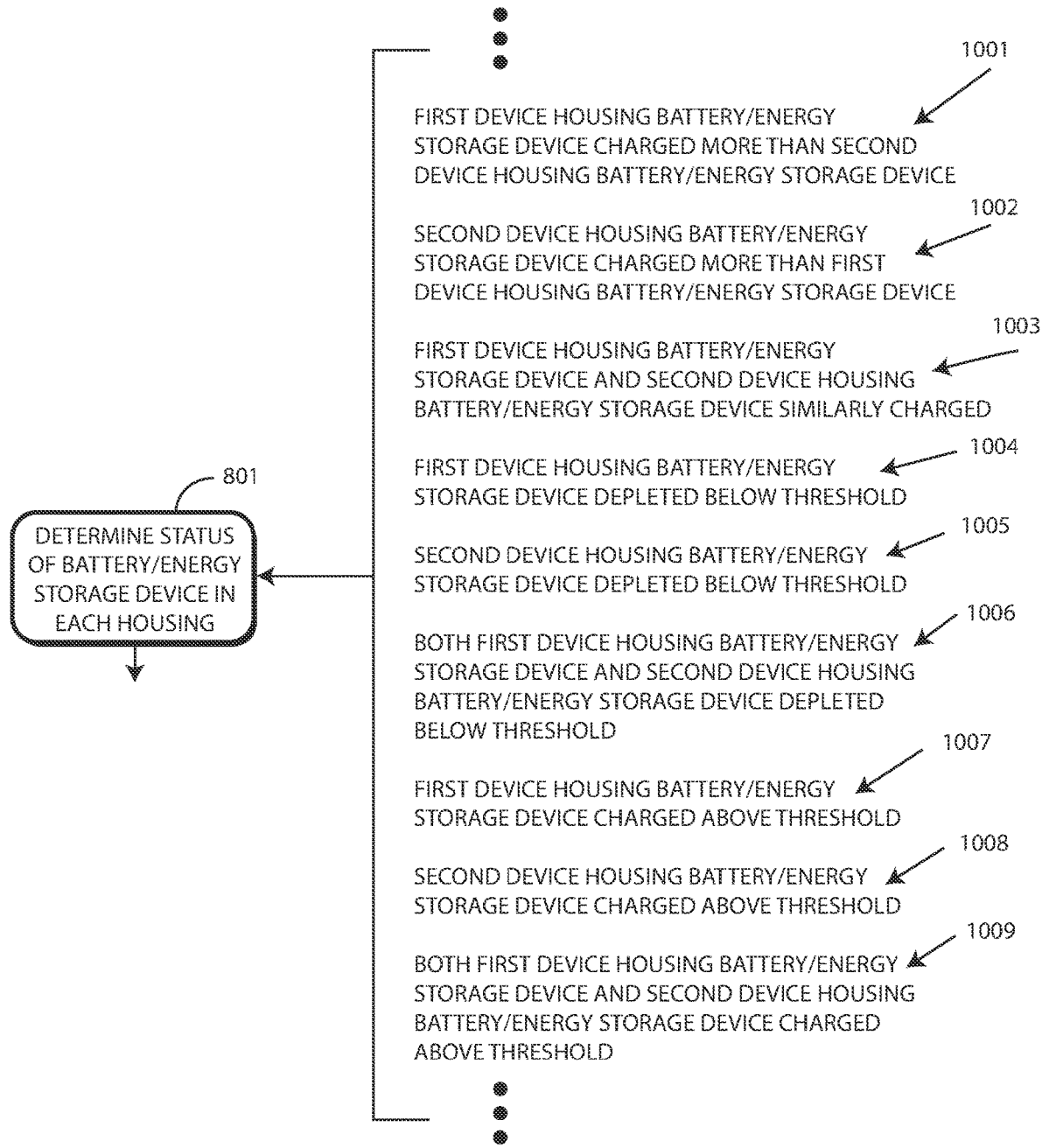
FIG. 10 illustrates one or more method steps in accordance with one or more embodiments of the disclosure.

This determination is made in one or more embodiments because if conditions are not sufficiently acceptable, the primary mode of operation where current is drawn from an energy storage device situated in a device housing that is not being held cannot occur. Turning now briefly to FIG. 10, illustrated therein are some of the conditions that can be identified by step 801.

One condition 1001 that could be encountered is that the first energy storage device is charged more than the second energy storage device. When this difference is within a predefined threshold, drawing current from an energy storage device situated in a device housing not being held works well. However, when the difference exceeds the threshold, to prevent the disparity between energy storage devices from becoming too large, it can be advantageous to at least momentarily (until the disparity falls within the threshold at a minimum) draw current from the energy storage device situated in the device housing being held.

When charging, while it is generally desirable to charge the energy storage device in the device housing not being held, if the difference between energy storage levels in the energy storage devices is outside the threshold it can be advantageous to at least momentarily charge the energy storage device in the device housing being held, at least until the disparity falls within the threshold.

Another condition 1002 that can arise is that the second energy storage device is charged more than the first energy storage device. When this difference is within a predefined threshold, drawing current from an energy storage device situated in a device housing not being held works well. However, when the difference exceeds the threshold, to prevent the disparity between energy storage devices from becoming too large, it can be advantageous to at least momentarily (until the disparity falls within the threshold at a minimum) draw current from the energy storage device situated in the device housing being held.

When charging, while it is generally desirable to charge the energy storage device in the device housing not being held, if the difference between energy storage levels in the energy storage devices is outside the threshold it can be advantageous to at least momentarily charge the energy storage device in the device housing being held, at least until the disparity falls within the threshold.

Another condition 1003 that can be encountered is that the energy storage devices are similarly charged. In such a condition, discharging or charging the energy storage device in the device housing not being held by, or held predominantly by, a hand works well.

Another condition 1004 that can be encountered is that the first energy storage device is depleted below a minimum energy storage level threshold. When this occurs, even if the electronic device is being held by the first device housing in which the first energy storage device is situated, the first energy storage device should be charged first to ensure that reliability of the energy storage device is not compromised. However, when this special factor 1104 exists the system can work normally when the electronic device is being held by the first device housing. When held by the second device housing, current powering the electronic device should be drawn from the second energy storage device even though this will heat the second device housing.

Another condition 1005 that can be encountered is that the second energy storage device is depleted below a minimum energy storage level threshold. When this occurs, even if the electronic device is being held by the second device housing in which the second energy storage device is situated, the second energy storage device should be charged first to ensure that reliability of the energy storage device is not compromised. However, when this condition 1005 exists the system can work normally when the electronic device is being held by the second device housing. When held by the first device housing, current powering the electronic device should be drawn from the first energy storage device even though this will heat the second device housing.

In another condition 1006, both the first energy storage device and the second energy storage device may be depleted to, or below, a minimum energy storage level threshold. When this occurs, the device is basically "dead." Current cannot be drawn from either energy storage device because reliability may be compromised. Generally, charging current will be delivered to both energy storage devices evenly until the energy storage levels rise above the minimum energy storage level threshold.

Another condition 1007 that can occur is that the first energy storage device is fully charged, or at least charged above a predefined energy storage level threshold. This condition 1007 is when the system works best provided the electronic device is being held by the second device housing. If being held by the first device housing, other checks would be required such as ensuring that condition 1005 is not occurring.

Another condition 1008 that can occur is that the second energy storage device is fully charged, or at least charged above a predefined energy storage level threshold. This condition 1008 is when the system works best provided the electronic device is being held by the first device housing. If being held by the second device housing, other checks would be required such as ensuring that condition 1004 is not occurring.

Yet another condition 1009 that can occur is the preferred condition, and that is where both the first energy storage device and the second energy storage device are charged above a predefined threshold. When this occurs, charging current can be delivered to the energy storage device situated in the device housing not being held until a maximum charge is reached. Thereafter it can be delivered to the energy storage device situated in the device housing being held. Discharge current can similarly be drawn from the energy storage device situated in the device housing not being held, at least until a minimum energy storage level is reached. Thereafter, current will need to be drawn from the energy storage device situated in the device housing being held, and so forth.

Turning now back to FIG. 8, decision 802 then determines whether the electronic device is coupled to a charger. Where it is, the method 800 proceeds to FIG. 9. Otherwise, the method 800 proceeds to step 803.

At step 803, one or more sensors of the electronic device optionally determine what conditions the electronic device is experiencing. These conditions can include whether the electronic device is moving or stationary, an orientation of the electronic device in three-dimensional space, e.g., whether it is oriented in a portrait orientation or landscape orientation, how the electronic device is being supported, e.g., by a hand or surface, and the geometric configuration of the electronic device, e.g., whether the electronic device is in the axially displaced open position, the closed position, or positions therebetween.

Decision 804 determines whether the electronic device is being supported by a hand or a surface. Techniques for doing this were described above with reference to FIGS. 1 and 6. Other such techniques will be obvious to those of ordinary skill in the art having the benefit of this disclosure.

Where the electronic device is being supported by a hand, the method 800 moves to decision 806. At decision 806, the method 800 determines whether the electronic device is being held by, or held predominantly by, the first device housing or the second device housing.

Where the electronic device is being held by, or held predominantly by, the first device housing, the method 800 moves to decision 809 where one or more sensors of the electronic device determine whether secondary factors exist. Decision 809 is similar to decision 805 and decision 810, and is further similar to decision (905), decision (909), and decision (910) of FIG. 9 below. Since these decisions are similar, some additional discussion concerning what the secondary factors are and how they can affect the method is warranted.

Figure 11:
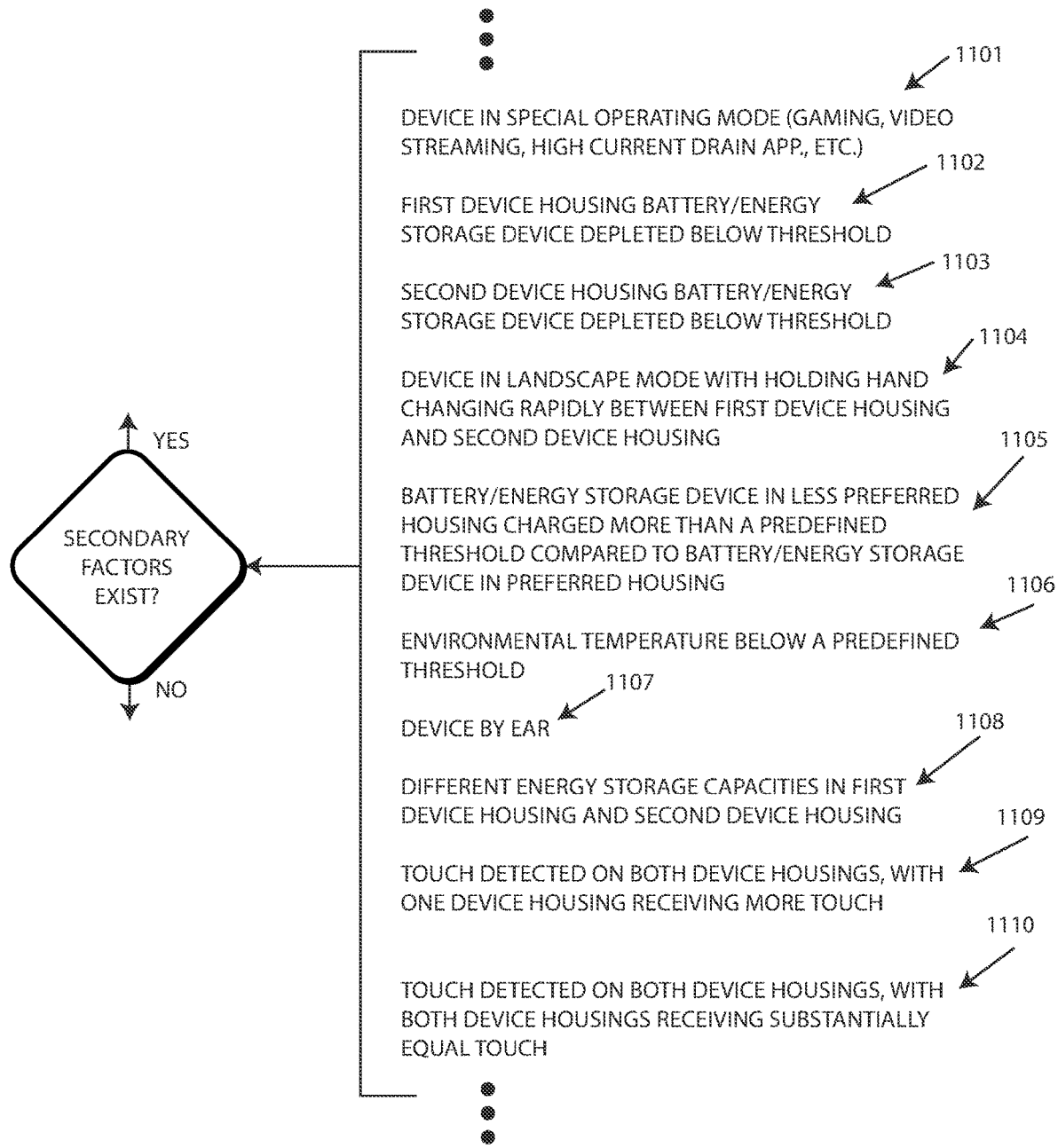
FIG. 11 illustrates one or more method steps in accordance with one or more embodiments of the disclosure.

Turning briefly to FIG. 11, illustrated therein are some additional secondary factors that can be determined at these decision steps of the method. Beginning with special factor 1101, this special factor 1101 occurs when a performance application is operating on one or more processors of the electronic device. Embodiments of the disclosure contemplate that performance applications generally require lots of processing power and therefore lots of current. Accordingly, while it may be desirable to draw current from a second energy storage device situated in a second device housing when a user is holding the first device housing, it may be preferable to draw current from the first energy storage device despite the fact that the first device housing is being held. This is true, for example, when the energy storage capacity of the first energy storage device is greater than the second energy storage device, and so forth.

Special factor 1102 and special factor 1103 occur the energy storage level of the first energy storage device or the second energy storage device is below a predefined threshold. As noted above, it is frequently desirable to draw current to power the electronic device from a second energy storage device situated in a second device housing when a user is holding, or predominantly holding, the first device housing. However, if the second energy storage device is insufficiently charged for this to occur, this would constitute a secondary consideration that might preclude this preferred method of operation.

Special factor 1104 occurs when the electronic device is in a landscape orientation while being handheld, with the hand predominantly supporting the electronic device changing very rapidly. Embodiments of the disclosure contemplate that some hysteresis needs to be included so that the system does not toggle rapidly when, for example, a person is rapidly switching the electronic device from the left hand to the right hand and so forth. Accordingly, when special factor 1104 exists, current may be drawn at least momentarily (or delivered to in a charging scenario) from the energy storage device situated in the device housing being held so as to prevent the frequent switching.

Special factor 1105 is an energy storage device energy storage level imbalance. Illustrating by example, if the electronic device is being held by the first device housing while the first energy storage device is charged more than a threshold above the second energy storage device, current may be drawn at least momentarily (or delivered to in a charging scenario) from the energy storage device situated in the device housing being held so as to prevent the imbalance from becoming excessive.

Special factor 1106 occurs when the ambient temperature around the electronic device becomes too low. Embodiments of the disclosure contemplate that many types of rechargeable batteries, especially lithium-based batteries, do not perform optimally in either extreme heat or extreme cold. Accordingly, in many situations it may be desirable to draw current (or deliver current in a charging scenario) from an energy storage device situated in the device housing being held. This can occur instead of, or in addition to drawing/delivering current to/from the energy storage device situated in the device housing not being held. The reasons for doing so may include warming the device housing being held to warm the user's hand, warming the energy storage devices themselves so they can perform more optimally, or other reasons.

Special factor 1107 comprises a device housing being adjacent to an ear. As previously described, embodiments of the disclosure contemplate that the ear is frequently more sensitive to temperature than the hand. Accordingly, when a device housing not being held is adjacent to an ear, current may be drawn at least momentarily (or delivered in a charging scenario) to the energy storage device situated in the device housing being held so as to prevent the ear from becoming too hot.

Special factor 1108 occurs when one energy storage device has a substantially larger energy storage capacity than another. As described above, in some scenarios the energy storage device situated in the lower device housing will have a larger energy storage capacity than the one in the upper device housing because sensors (image capture devices, for example) and displays (both internal and external) are carried by the upper device housing. Accordingly, when this special factor 1108 occurs and, for example, one or more processors of the electronic device need additional current for another special factor 1101, current may be drawn at least momentarily (or delivered in a charging scenario) to the energy storage device situated in the device housing being held since it has the higher energy storage capacity.

Special factor 1109 comprises the electronic device being held by both device housings, but with one receiving more touch. When this occurs, energy is drawn from (or delivered to in a charging scenario) the energy storage device situated in the device housing receiving less touch unless another special factor, e.g., special factor 1102 or special factor 1103) is occurring.

Special factor 1110 is similar to special factor 1108, albeit with both device housings receiving approximately equal touch. In such scenarios, current is drawn from the energy storage device having the higher energy storage level or delivered to the energy storage device having the lower energy storage level in one or more embodiments.

These examples of secondary factors that might preclude the preferred operation set forth in FIG. 11 are illustrative only. Others will be obvious to those of ordinary skill in the art having the benefit of this disclosure.

Turning now back to FIG. 8, if secondary factors precluding the preferred mode of operation from occurring exists, the method 800 moves to step 812 where current required to power the electronic device is drawn from, or predominantly from, the first energy storage device situated in the first device housing despite the fact that the user is holding the first device housing. Otherwise, current required to power the electronic device is drawn from, or predominantly from, the second energy storage device situated in the second device housing when the user is holding the first device housing at step 811.

Similar steps can occur when the electronic device is being held by, or held predominantly by, the second device housing, as determined by decision 806. Decision 810 can then determine whether secondary factors precluding the preferred mode of operation from occurring. If, for example, the energy storage level of the first energy storage device is too low to power the electronic device when the user is holding the second device housing, this would constitute such a secondary factor to be determined at decision 810. Others will be obvious to those of ordinary skill in the art having the benefit of this disclosure.

If secondary factors precluding the preferred mode of operation from occurring exists, the method 800 moves to step 811 where current required to power the electronic device is drawn from, or predominantly from, the second energy storage device situated in the second device housing despite the fact that the user is holding the second device housing. Otherwise, current required to power the electronic device is drawn from, or predominantly from, the first energy storage device situated in the first device housing when the user is holding the first device housing at step 812.

When the electronic device is being supported by a surface, decision 805 determines whether secondary factors exist. One example of such a secondary factor would be whether the energy storage level of each of the first energy storage device and the second energy storage device is sufficient to power the electronic device, whether a performance application is operating on the one or more processors, and so forth. Where there are no secondary factors precluding the preferred method of operation, when the electronic device is supported by a surface step 807 comprises powering the electronic device from the first energy storage device situated in the first device housing. However, where secondary factors preclude this mode of operation, such as when the first energy storage device has insufficient charge to power the electronic device, current is drawn from the second energy storage device situated in the second device housing at step 808.

Turning now to the method 900 of FIG. 9, the selection of which of the first energy storage device or second energy storage device to charge at a given point in time is illustrated. Beginning with step 901, at this step 901 one or more processors or a thermal mitigation circuit of an electronic device determine the amount of energy stored in the energy storage device situated in the first device housing and the second device housing. Scenarios that can occur at this step 901, as well as their implications, were described above with reference to FIG. 10 and are incorporated here by reference. In one or more embodiments, when a single energy storage device is situated in the first device housing and another energy storage device is situated in the second device housing, step 901 comprises determining how much energy is stored in each energy storage device.

Decision 902 then determines whether the electronic device is coupled to a charger. Where it is, the method 900 proceeds to FIG. 8. Otherwise, the method 900 proceeds to step 903.

At step 903, one or more sensors of the electronic device optionally determine what conditions the electronic device is experiencing. These conditions can include whether the electronic device is moving or stationary, an orientation of the electronic device in three-dimensional space, e.g., whether it is oriented in a portrait orientation or landscape orientation, how the electronic device is being supported, e.g., by a hand or surface, and the geometric configuration of the electronic device, e.g., whether the electronic device is in the axially displaced open position, the closed position, or positions therebetween.

Decision 904 determines whether the electronic device is being supported by a hand or a surface. Techniques for doing this were described above with reference to FIGS. 1 and 6. Other such techniques will be obvious to those of ordinary skill in the art having the benefit of this disclosure.

Where the electronic device is being supported by a hand, the method 900 moves to decision 906. At decision 906, the method 900 determines whether the electronic device is being held by, or held predominantly by, the first device housing or the second device housing.

Where the electronic device is being held by, or held predominantly by, the first device housing, the method 900 moves to decision 909 where one or more sensors of the electronic device determine whether secondary factors exist. Secondary factors were described above with reference to FIG. 11 and apply here. These secondary factors include determining conditions such as whether the energy storage level of the first energy storage device or the second energy storage device is below a predefined threshold. As noted above, it is frequently desirable to deliver current to charge an energy storage device situated in a second device housing when a user is holding, or predominantly holding, the first device housing. However, if the second energy storage device is sufficiently charged, this would constitute a secondary consideration that might preclude this preferred method of operation and instead cause current to be delivered to the energy storage device situated in the first device housing.

If secondary factors precluding the preferred mode of operation from occurring exists, the method 900 moves to step 912 where current is delivered to, or predominantly to, the first energy storage device situated in the first device housing despite the fact that the user is holding the first device housing. Otherwise, current is delivered to, or predominantly to, the second energy storage device situated in the second device housing when the user is holding the first device housing at step 911.

Similar steps can occur when the electronic device is being held by, or held predominantly by, the second device housing, as determined by decision 906. Decision 910 can then determine whether secondary factors precluding the preferred mode of operation from occurring. If, for example, the energy storage level of the first energy storage device is too high to continue charging the same when the user is holding the second device housing, this would constitute such a secondary factor to be determined at decision 910. Others will be obvious to those of ordinary skill in the art having the benefit of this disclosure.

If secondary factors precluding the preferred mode of operation from occurring exists, the method 900 moves to step 911 where current is delivered to, or predominantly to, the second energy storage device situated in the second device housing despite the fact that the user is holding the second device housing. Otherwise, current is delivered to, or predominantly to, the first energy storage device situated in the first device housing when the user is holding the first device housing at step 912.

When the electronic device is being supported by a surface, decision 905 determines whether secondary factors exist. One example of such a secondary factor would be whether the energy storage level of each of the first energy storage device and the second energy storage device is below a minimum energy storage level, whether a disparity in energy storage level between the energy storage devices is beyond a threshold, and so forth. Where there are no secondary factors precluding the preferred method of operation, when the electronic device is supported by a surface step 907 comprises charging the first energy storage device situated in the first device housing. However, where secondary factors preclude this mode of operation, such as when the first energy storage device has sufficient charge to power the electronic device, current is delivered from the second energy storage device situated in the second device housing at step 908.

Now that the general hardware, systems, and methods have been described, attention will be turned to some use cases occurring in accordance with one or more embodiments of the disclosure. The use cases describe below provide illustrations of operations of embodiments of the disclosure both in the presence of, and in the absence of secondary factors. Specifically, FIGS. 12-17 illustrate both use cases in which the preferred mode of operation occurs and other use cases where the preferred mode of operation is precluded by a special factor.

Figure 12:
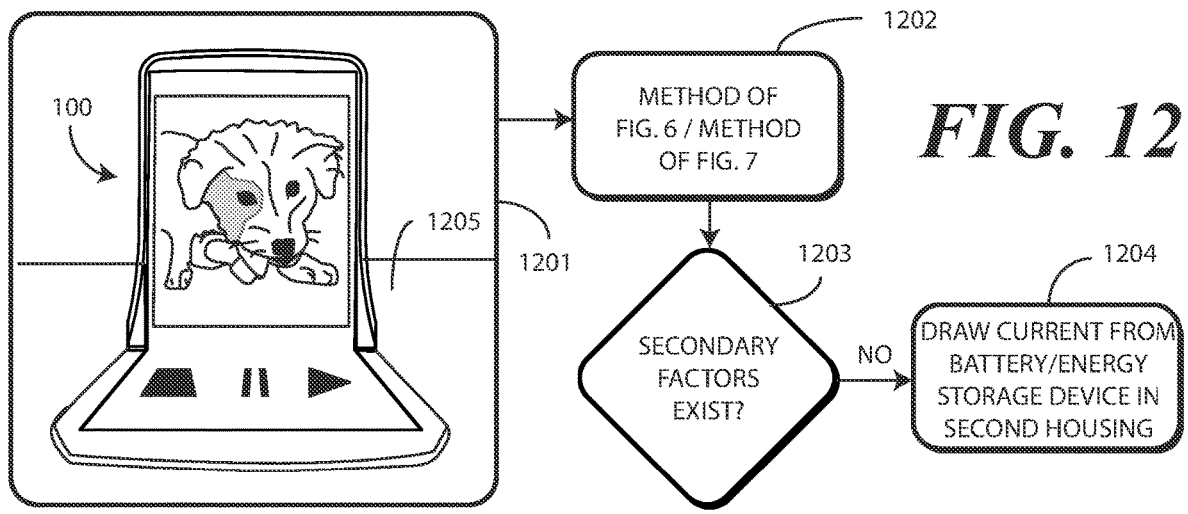
FIG. 12 illustrates one or more method steps in accordance with one or more embodiments of the disclosure.

Turning now to FIG. 12, illustrated therein is one such use case. As shown at step 1201, an electronic device 100 configured in accordance with one or more embodiments of the disclosure is being supported by a surface 1205 while in a partially bent configuration (the tent configuration) that is between the axially displaced open position and the closed position. After performing the method (800) of FIG. 8 at step 1202 (the method (900) of FIG. 9 could have been performed had the electronic device 100 been coupled to a charger), decision 1203 confirms no secondary factors are occurring. Accordingly, step 1204 draws current to power the one or more processors of the electronic device from the first energy storage device situated in the first device housing. In one or more embodiments, this is the preferred mode of operation because the energy storage device situated in the first device housing is larger and includes a higher energy storage capacity than does the energy storage device situated in the second device housing.

Figure 13:
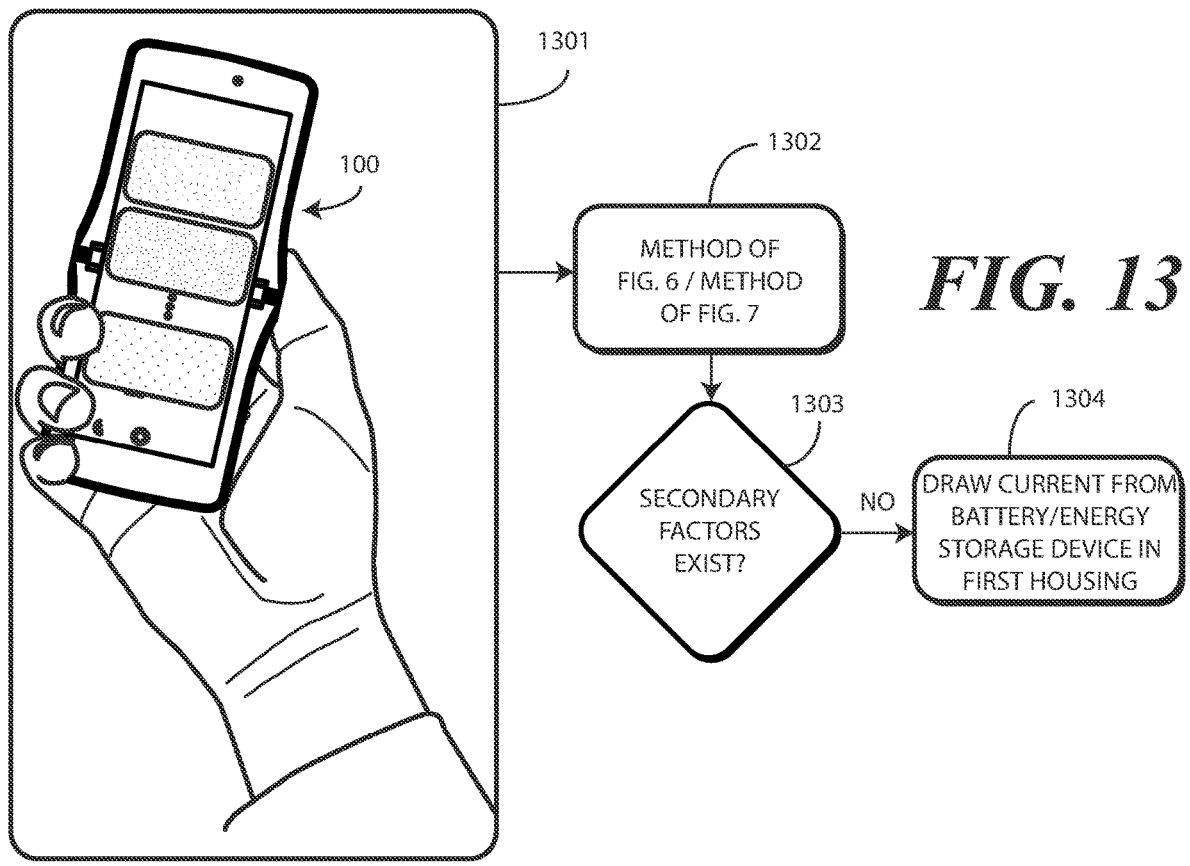
FIG. 13 illustrates one or more method steps in accordance with one or more embodiments of the disclosure.

Turning now to FIG. 13, in this use case the electronic device 100 is in the axially displaced open position and is being supported by a hand as shown at step 1301. After performing the method (800) of FIG. 8 at step 1302 (the method (900) of FIG. 9 could have been performed had the electronic device 100 been coupled to a charger), decision 1303 confirms that no secondary factors are occurring. Accordingly, at step 1304 current required to power the electronic device 100 is drawn from the second energy storage device situated in the second device housing to prevent the first device housing that the user is holding from becoming excessively warm. Heat is therefore generated in the second device housing, while keeping the first device housing relatively cool (at least cooler than the second device housing).

Figure 14:
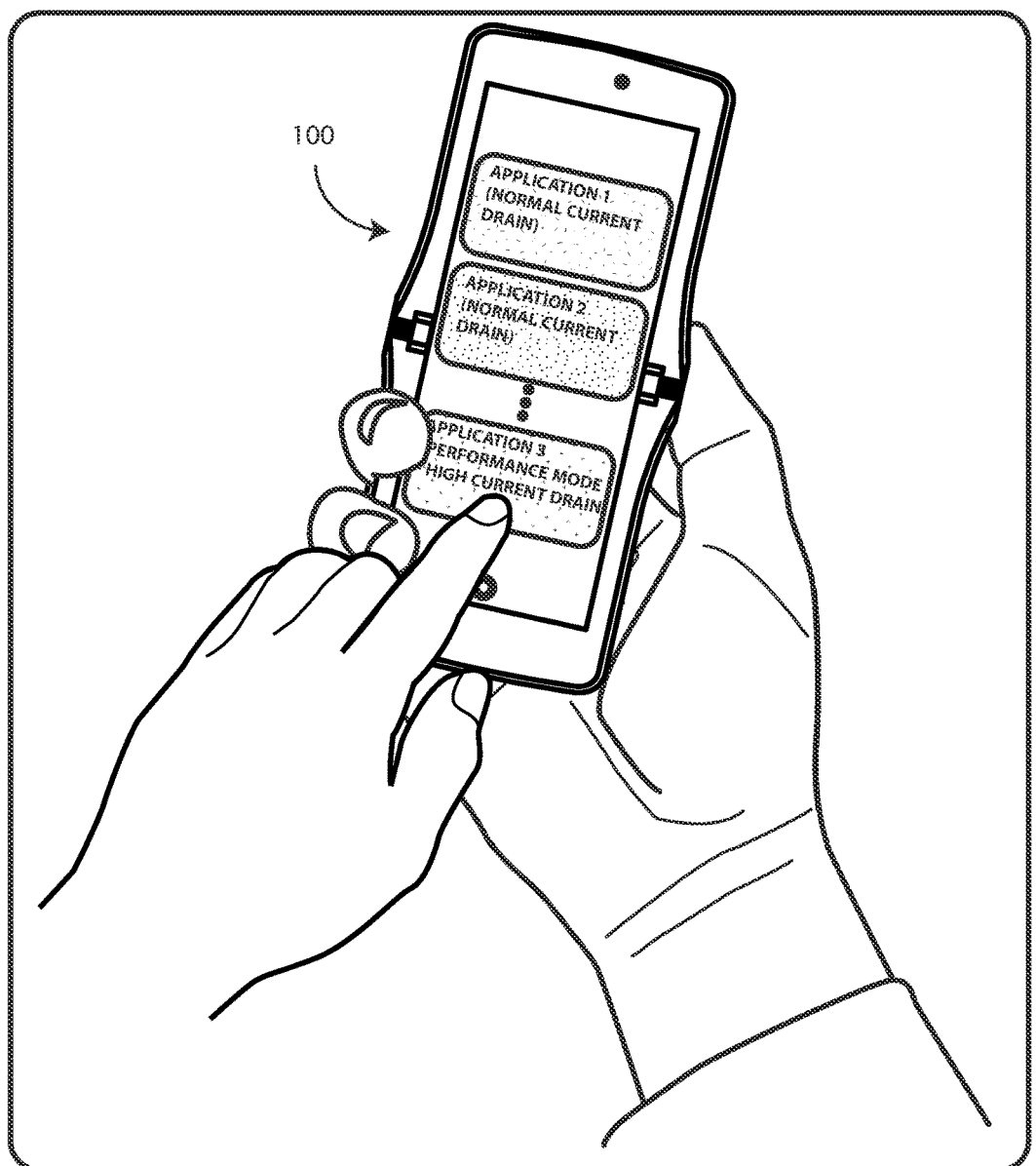
FIG. 14 illustrates one or more method steps in accordance with one or more embodiments of the disclosure.

Turning now to FIG. 14, in this use case the electronic device 100 is in the axially displaced open position and is being supported by a hand as shown at step 1401. As also shown at step 1401, the user of the electronic device 100 is launching a performance application, which constitutes a secondary factor to be considered.

After performing the method (800) of FIG. 8 at step 1402 (the method (900) of FIG. 9 could have been performed had the electronic device 100 been coupled to a charger), decision 1403 confirms that the secondary factor of a performance application operating on the one or more processors is occurring. Accordingly, at step 1401 current required to power the electronic device 100 is drawn from the first energy storage device situated in the first device housing despite the fact that the user is holding the first device housing. In one or more embodiments, this is the preferred mode of operation because the energy storage device situated in the first device housing is larger and includes a higher energy storage capacity than does the energy storage device situated in the second device housing. Thus, it allows for the extra processing power required by the one or more processors to be performed. It should be noted that at step 1404 current could concurrently be drawn from the second energy storage device situated in the second device housing as well.

Figure 15:
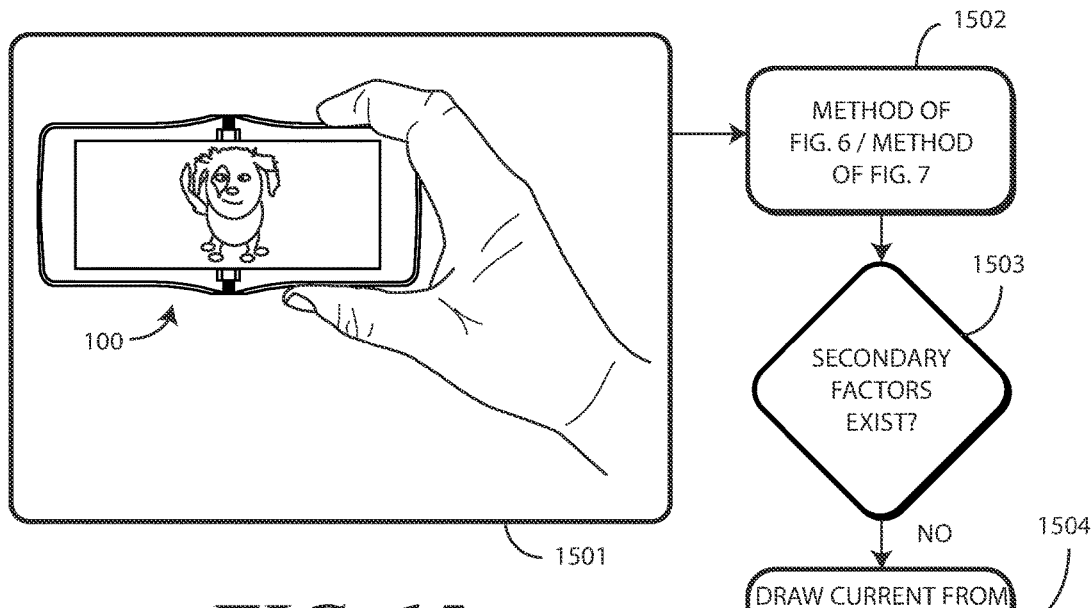
FIG. 15 illustrates one or more method steps in accordance with one or more embodiments of the disclosure.

Turning now to FIG. 15, in this use case the electronic device 100 is in the axially displaced open position and is being supported by a hand as shown at step 1501 while in the landscape orientation. After performing the method (800) of FIG. 8 at step 1502 (the method (900) of FIG. 9 could have been performed had the electronic device 100 been coupled to a charger), decision 1503 confirms that no secondary factors are occurring. Accordingly, at step 1504 current required to power the electronic device 100 is drawn from the second energy storage device situated in the second device housing to prevent the first device housing that the user is holding from becoming excessively warm. Heat is therefore generated in the second device housing, while keeping the first device housing relatively cool (at least cooler than the second device housing).

Figure 16:
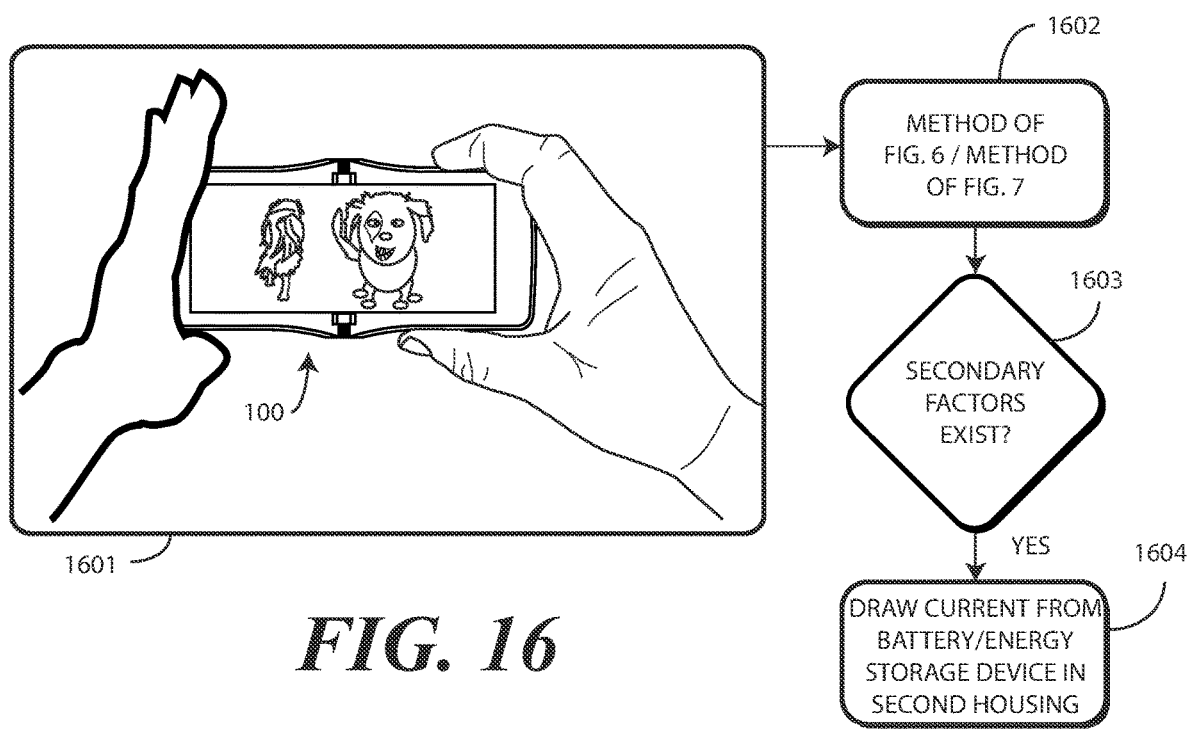
FIG. 16 illustrates one or more method steps in accordance with one or more embodiments of the disclosure.

Turning now to FIG. 16, in this use case the electronic device 100 is in the axially displaced open position and is being supported by two hands as shown at step 1601 while in the landscape orientation. However, the first device housing is being supported more substantially by the hand using the pinch grip. The second device housing is being supported only at the end by a flattened palm. Accordingly, the second device housing is receiving less touch input than the first device housing. Being touched by two hands on two device housings is a secondary factor.

After performing the method (800) of FIG. 8 at step 1602 (the method (900) of FIG. 9 could have been performed had the electronic device 100 been coupled to a charger), decision 1603 confirms that the aforementioned secondary factor is occurring. Still, despite the fact that the second device housing is receiving touch input, it is receiving less touch input than the first device housing. Accordingly, at step 1604 current required to power the electronic device 100 is drawn from the second energy storage device situated in the second device housing to prevent the first device housing that the user is holding with more touch input from becoming excessively warm.

Figure 17:
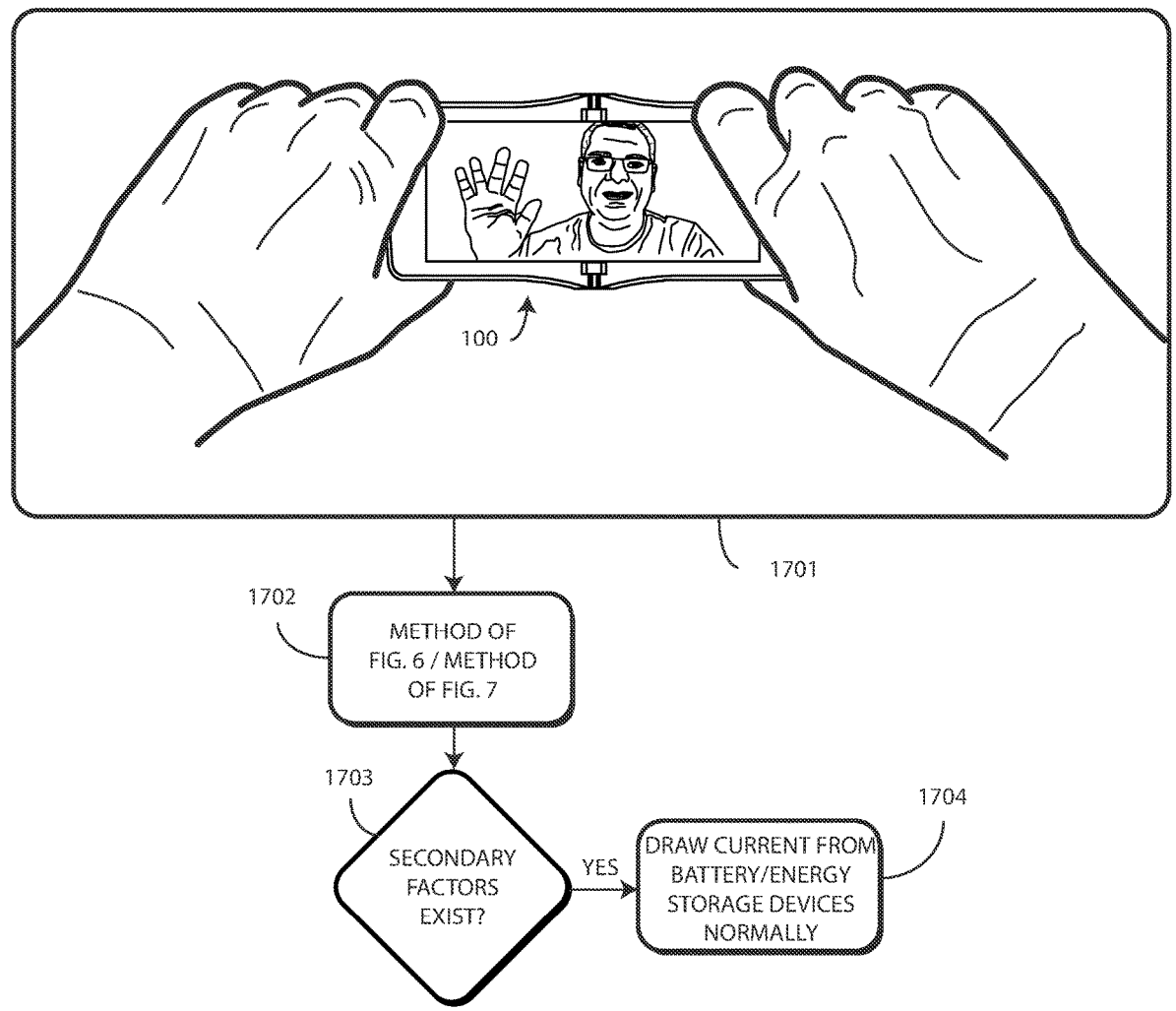
FIG. 17 illustrates one or more method steps in accordance with one or more embodiments of the disclosure.

Turning now to FIG. 17, in this use case the electronic device 100 is in the axially displaced open position and is being supported by two hands as shown at step 1701 while in the landscape orientation. In contrast to FIG. 16, here the first device housing and second device housing are being supported approximately equally. As noted above, being touched by two hands on two device housings is a secondary factor.

After performing the method (800) of FIG. 8 at step 1702 (the method (900) of FIG. 8 could have been performed had the electronic device 100 been coupled to a charger), decision 1703 confirms that the aforementioned secondary factor is occurring. Since the sensors of the electronic device 100 are unable to detect one device housing being substantially supported by more touch input, at step 1704 current required to power the electronic device 100 is drawn from both the first energy storage device situated in the first device housing and the second energy storage device situated in the second device housing substantially equally to allow the first device housing and the second device housing to heat substantially equally.

It should be noted that the use cases illustrated and described with reference to FIGS. 12-17 are illustrative only and represent only a small portion of the myriad of scenarios that can occur when the geometric configurations and orientations of the electronic device, the support conditions, the charge states of FIG. 10 and the secondary factors of FIG. 11 are processed using the methods of FIGS. 6 and 7. Accordingly, numerous others will be obvious to those of ordinary skill in the art having the benefit of this disclosure.

Figure 18:
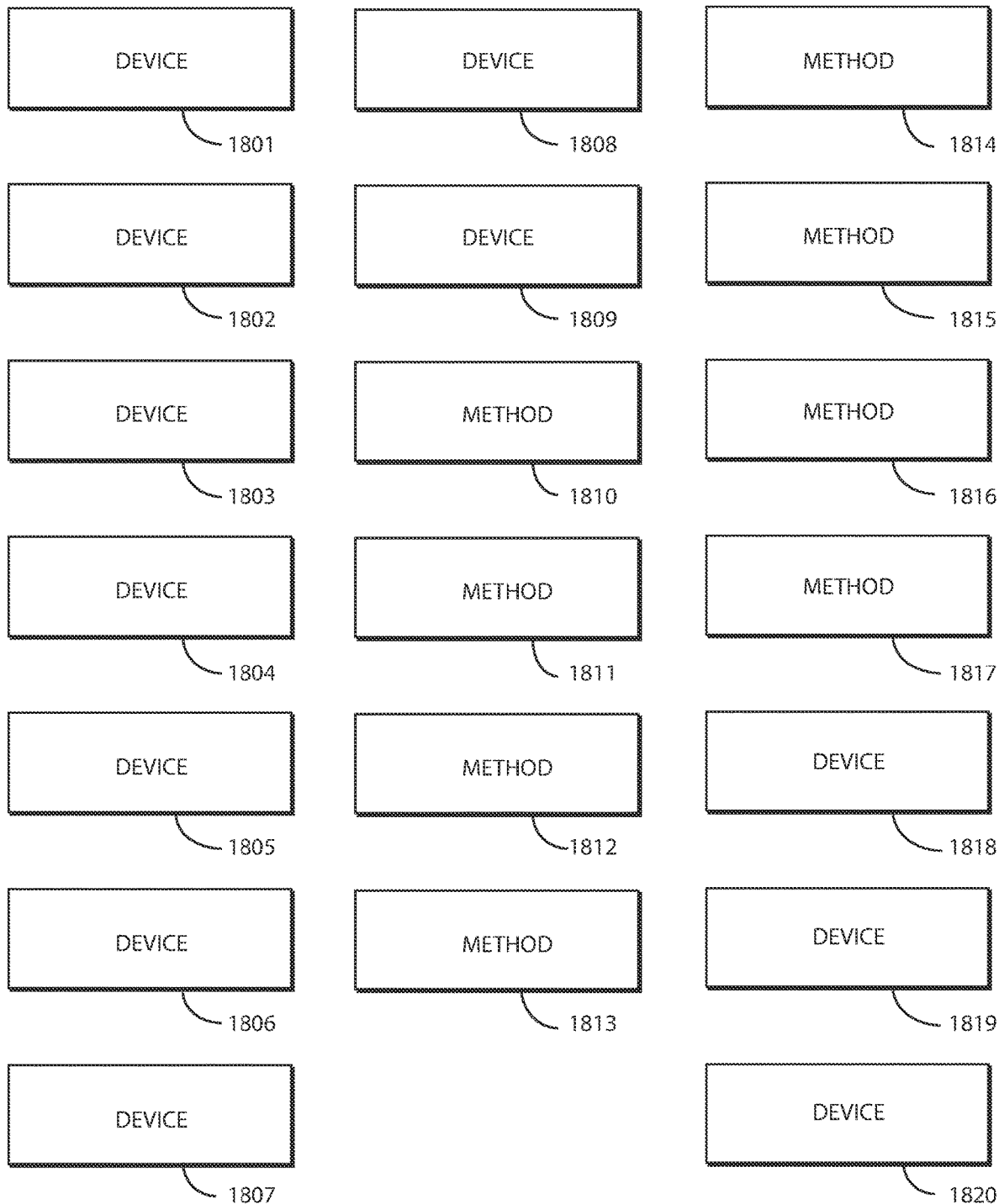
FIG. 18 illustrates one or more embodiments of the disclosure.

Turning now to FIG. 18, illustrated therein are various embodiments of the disclosure. The embodiments of FIG. 18 are shown as labeled boxes in FIG. 18 due to the fact that the individual components of these embodiments have been illustrated in detail in FIGS. 1-17, which precede FIG. 18. Accordingly, since these items have previously been illustrated and described, their repeated illustration is no longer essential for a proper understanding of these embodiments. Thus, the embodiments are shown as labeled boxes.

At 1801, an electronic device comprises a first device housing pivotable about a hinge relative to a second device housing between an axially displaced open position and a closed position. At 1801, the electronic device comprises one or more processors and one or more sensors operable with the one or more processors. At 1801, the electronic device comprises a first energy storage device situated in the first device housing and operable to power the one or more processors and a second energy storage device situated in the second device housing and also operable to power the one or more processors.

At 1803, the electronic device comprises a thermal mitigation circuit. At 1801, the thermal mitigation circuit is operable with the first energy storage device and the second energy storage device.

At 1801, the thermal mitigation circuit powers the one or more processors with more current from the first energy storage device than the second energy storage device when the one or more sensors detect a first operating condition of the electronic device. At 1801, the thermal mitigation circuit powers the one or more processors with more current from the second energy storage device than the first energy storage device when the one or more sensors detect a second operating condition of the electronic device.

At 1802, the first operating condition of 1801 comprises the electronic device being held by, or held predominantly by, the second device housing when the electronic device is in the axially displaced open position. At 1802, the second operating condition of 1801 comprises the electronic device being held by, or held predominantly by, the first device housing when the electronic device is in the axially displaced open position.

At 1803, the first operating condition of 1801 comprises the electronic device being held by, or held predominantly by, the second device housing when the electronic device is in the axially displaced open position. At 1803, the second operating condition of 1801 comprises the electronic device being supported by a surface.

At 1804, the first operating condition of 1801 comprises the electronic device being supported by a surface. At 1804, the second operating condition of 1801 comprises the electronic device being held while in the closed position.

At 1805, the thermal mitigation circuit of 1801 powers the one or more processors with current only from the first energy storage device when the one or more sensors detect the first operating condition of the electronic device. At 1805, the thermal mitigation circuit of 1801 powers the one or more processors with current only from the second energy storage device when the one or more sensors detect the second operating condition of the electronic device.

At 1806, the first operating condition of 1801 comprises the electronic device being held, or predominantly held, by the first device housing while the electronic device is in the axially displaced open position and a performance application is operating on the one or more processors. At 1806, the second operating condition of 1801 comprises the electronic device being held, or predominantly held, by the second device housing when a difference between a first energy storage device energy storage level and a second device housing energy storage level exceeds a predefined threshold.

At 1807, the first operating condition of 1801 comprises the electronic device being held, or predominantly held, by the first device housing while the second device housing is adjacent to an ear. At 1807, the second operating condition of 1801 comprises the electronic device being held, or predominantly held, by the first device housing while the second device housing is away from the ear.

At 1808, the thermal mitigation circuit of 1801 charges the first energy storage device with more current than the second energy storage device when the one or more sensors detect a third operating condition of the electronic device. At 1801, the thermal mitigation circuit of 1801 charges the second energy storage device with more current than the first energy storage device when the one or more sensors detect a fourth operating condition of the electronic device.

At 1809, the third operating condition of 1808 comprises the electronic device being held by, or held predominantly by, the second device housing when the electronic device is in the axially displaced open position and connected to a charger. At 1809, the fourth operating condition of 1808 comprises the electronic device being held by, or held predominantly by, the first device housing when the electronic device is in the axially displaced open position and connected to the charger.

At 1810, a method in an electronic device comprises determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device.

At 1811, the support condition of 1810 comprises the electronic device being held. At 1811, the geometric configuration of 1810 comprises the electronic device being in the axially displaced open position.

At 1812, the support condition of 1811 further comprises the electronic device being held, or substantially held, by the first device housing. At 1812, the determining of 1811 results in more current being drawn from the second energy storage device.

At 1813, the support condition of 1811 further comprises the electronic device being held, or substantially held, by the second device housing. At 1813, the determining of 1811 results in more current being drawn from the first energy storage device.

At 1814, the support condition of 1810 comprises the electronic device being held. At 1814, the geometric configuration of 1810 comprises the electronic device being in the closed position. At 1814, the determining of 1810 results in more current being drawn from the second energy storage device.

At 1815, the support condition of 1810 comprises the electronic device being supported by a surface. At 1815, the geometric configuration of 1810 comprises the electronic device being in the axially displaced open position. At 1815, the determining of 1810 results in more current being drawn from the first energy storage device.

At 1816, the method of 1810 further comprises determining whether to charge the first energy storage device situated in a first device housing with more current than the second energy storage device situated in the second device housing as a function of the support condition of the electronic device detected by the one or more sensors of the electronic device and the geometric configuration of the electronic device when the electronic device is connected to a charger.

At 1817, the support condition of 1810 comprises the electronic device being supported by a surface. At 1817, the geometric configuration of 1810 comprises the electronic device being in a partially open position between the axially displaced open position and the closed position. At 1817, the determining of 1810 results in more current being drawn from the first energy storage device.

At 1818, an electronic device comprises a first device housing coupled to a second device housing by a hinge and pivotable about the hinge relative to the second device housing between an axially displaced open position and a closed position. At 1818, the electronic device comprises a first energy storage device situated in the first device housing. At 1818, the electronic device comprises a second energy storage device situated in the second device housing.

At 1818, the electronic device comprises one or more processors operable to perform functions of the electronic device. At 1818, the electronic device comprises one or more sensors operable with the one or more processors.

At 1818, the one or more processors select the first energy storage device to power the electronic device when the one or more sensors determine the electronic device is being supported by a surface or held by the second device housing. At 1818, the one or more processors select the second energy storage device to power the electronic device when the electronic device is being held by the first device housing.

At 1819, the electronic device of 1818 further comprises a charger coupled to the electronic device. At 1819, the one or more processors of 1818 select the first energy storage device to be charged by the charger when the one or more sensors determine the electronic device is being supported by the surface or held by the second device housing. At 1819, the one or more processors of 1818 select the second energy storage device to be charged by the charger when the electronic device is being held by the first device housing.

At 1820, the one or more processors of 1818 also select the second energy storage device to power the electronic device when the electronic device is being held while in the closed position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a first device housing pivotable about a hinge relative to a second device housing between an axially displaced open position and a closed position;
one or more processors;
one or more sensors operable with the one or more processors;
a first energy storage device situated in the first device housing and operable to power the one or more processors;
a second energy storage device situated in the second device housing and also operable to power the one or more processors; and
a thermal mitigation circuit operable with the first energy storage device and the second energy storage device, the thermal mitigation circuit:
powering the one or more processors with more current from the first energy storage device than the second energy storage device when the one or more sensors detect a first operating condition of the electronic device; and
powering the one or more processors with more current from the second energy storage device than the first energy storage device when the one or more sensors detect a second operating condition of the electronic device;
wherein:
the first operating condition comprises the electronic device being held, or predominantly held, by the first device housing while the electronic device is in the axially displaced open position and a performance application is operating on the one or more processors; and
the second operating condition comprises the electronic device being held, or predominantly held, by the second device housing when a difference between a first energy storage device energy storage level and a second device housing energy storage level exceeds a predefined threshold.

2. The electronic device of claim 1, wherein:
the first operating condition comprises the electronic device being held predominantly by, the first device housing when the electronic device is in the axially displaced open position; and
the second operating condition comprises the electronic device being held predominantly by, the second device housing when the electronic device is in the axially displaced open position.

3. The electronic device of claim 1, wherein:
the first operating condition comprises the electronic device being held by the first device housing when the electronic device is in the axially displaced open position; and
the second operating condition comprises the electronic device being held by the second device housing when the electronic device is in the axially displaced open position.

4. The electronic device of claim 1, wherein the performance application comprises a gaming application.

5. The electronic device of claim 1, the thermal mitigation circuit:
powering the one or more processors with current only from the first energy storage device when the one or more sensors detect the first operating condition of the electronic device; and
powering the one or more processors with current only from the second energy storage device when the one or more sensors detect the second operating condition of the electronic device.

6. The electronic device of claim 1, wherein the performance application comprises a video processing application.

7. The electronic device of claim 1, wherein
the second operating condition further comprises the electronic device being held, or predominantly held, by the first device housing while the second device housing is away from the ear.

8. The electronic device of claim 1, the thermal mitigation circuit:
charging the first energy storage device with more current than the second energy storage device when the one or more sensors detect a third operating condition of the electronic device; and
charging the second energy storage device with more current than the first energy storage device when the one or more sensors detect a fourth operating condition of the electronic device.

9. The electronic device of claim 8, wherein:
the third operating condition comprises the electronic device being held predominantly by, the second device housing when the electronic device is in the axially displaced open position and connected to a charger; and
the fourth operating condition comprises the electronic device being held predominantly by, the first device housing when the electronic device is in the axially displaced open position and connected to the charger.

10. A method in an electronic device, the method comprising determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device, wherein the support condition comprises the electronic device being supported by a surface.

11. The method of claim 10, wherein the geometric configuration comprises the electronic device being in the axially displaced open position.

12. The method of claim 11, wherein the determining results in more current being drawn from the second energy storage device.

13. The method of claim 11, wherein the determining results in more current being drawn from the first energy storage device.

14. The method of claim 10, wherein the geometric configuration comprises the electronic device being in the closed position, and the determining results in more current being drawn from the second energy storage device.

15. The method of claim 10, wherein the geometric configuration comprises the electronic device being in the axially displaced open position, and the determining results in more current being drawn from the first energy storage device than the second energy storage device.

16. The method of claim 10, further comprising determining whether to charge the first energy storage device situated in a first device housing with more current than the second energy storage device situated in the second device housing as a function of the support condition of the electronic device detected by the one or more sensors of the electronic device and the geometric configuration of the electronic device when the electronic device is connected to a charger.

17. The method of claim 10, wherein the geometric configuration comprises the electronic device being in a partially open position between the axially displaced open position and the closed position, and the determining results in more current being drawn from the first energy storage device.

18. An electronic device, comprising:
a first device housing coupled to a second device housing by a hinge and pivotable about the hinge relative to the second device housing between an axially displaced open position and a closed position;
a first energy storage device situated in the first device housing;
a second energy storage device situated in the second device housing;
one or more processors operable to perform functions of the electronic device; and
one or more sensors operable with the one or more processors;
wherein the one or more processors select:
the first energy storage device to power the electronic device when the one or more sensors determine the electronic device is being supported by a surface or held by the second device housing; or
the second energy storage device to power the electronic device when the electronic device is being held by the first device housing; and
the one or more processors also select the second energy storage device to power the electronic device when the electronic device is being held while in the closed position.

19. The electronic device of claim 18, further comprising a charger coupled to the electronic device, wherein the one or more processors select:
the first energy storage device to be charged by the charger when the one or more sensors determine the electronic device is being supported by the surface or held by the second device housing; or
the second energy storage device to be charged by the charger when the electronic device is being held by the first device housing.

20. A method in an electronic device, the method comprising determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device, wherein the support condition comprises the electronic device being held, the geometric configuration comprises the electronic device being in the closed position, and the determining results in more current being drawn from the second energy storage device.

21. A method in an electronic device, the method comprising determining whether to draw more current from a first energy storage device situated in a first device housing pivotable about a hinge relative to a second device housing between an axially displaced open position and a closed position or a second energy storage device situated in the second device housing as a function of a support condition of the electronic device detected by one or more sensors of the electronic device and a geometric configuration of the electronic device, further comprising determining whether to charge the first energy storage device situated in a first device housing with more current than the second energy storage device situated in the second device housing as a function of the support condition of the electronic device detected by the one or more sensors of the electronic device and the geometric configuration of the electronic device when the electronic device is connected to a charger.

22. An electronic device, comprising:
a first device housing pivotable about a hinge relative to a second device housing between an axially displaced open position and a closed position;
one or more processors;
one or more sensors operable with the one or more processors;
a first energy storage device situated in the first device housing and operable to power the one or more processors;
a second energy storage device situated in the second device housing and also operable to power the one or more processors; and
a thermal mitigation circuit operable with the first energy storage device and the second energy storage device, the thermal mitigation circuit:
powering the one or more processors with more current from the first energy storage device than the second energy storage device when the one or more sensors detect a first operating condition of the electronic device; and
powering the one or more processors with more current from the second energy storage device than the first energy storage device when the one or more sensors detect a second operating condition of the electronic device;
wherein:
the first operating condition comprises the electronic device being held, or predominantly held, by the first device housing while the second device housing is adjacent to an ear; and
the second operating condition comprises the electronic device being held, or predominantly held, by the first device housing while the second device housing is away from the ear.

23. An electronic device, comprising:
a first device housing pivotable about a hinge relative to a second device housing between an axially displaced open position and a closed position;
one or more processors;
one or more sensors operable with the one or more processors;
a first energy storage device situated in the first device housing and operable to power the one or more processors;
a second energy storage device situated in the second device housing and also operable to power the one or more processors; and
a thermal mitigation circuit operable with the first energy storage device and the second energy storage device, the thermal mitigation circuit:
powering the one or more processors with more current from the first energy storage device than the second energy storage device when the one or more sensors detect a first operating condition of the electronic device; and
powering the one or more processors with more current from the second energy storage device than the first energy storage device when the one or more sensors detect a second operating condition of the electronic device;
wherein:
the first operating condition comprises the electronic device being supported by a surface; and
the second operating condition comprises the electronic device being held while in the closed position.

* * * * *